United States Patent
Chaturvedi et al.

(10) Patent No.: US 12,229,172 B2
(45) Date of Patent: Feb. 18, 2025

(54) SYSTEMS AND METHODS FOR GENERATING USER INPUTS USING A DUAL-PATHWAY MODEL

(71) Applicant: Capital One Services, LLC, McLean, VA (US)

(72) Inventors: Isha Chaturvedi, Mountain View, CA (US); Mohammad Sorower, Great Falls, VA (US); Andy Luo, Arlington, VA (US); William Huang, New York, NY (US); Anirban Das, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/344,821

(22) Filed: Jun. 29, 2023

(65) Prior Publication Data

US 2025/0005049 A1    Jan. 2, 2025

(51) Int. Cl.
*G06F 16/00* (2019.01)
*G06F 16/332* (2019.01)
*G06N 5/02* (2023.01)

(52) U.S. Cl.
CPC ........ *G06F 16/3323* (2019.01); *G06F 16/334* (2019.01); *G06N 5/02* (2013.01)

(58) Field of Classification Search
CPC ...... G06F 16/3323; G06F 16/334; G06N 5/02
USPC .................................. 707/600–899
See application file for complete search history.

(56) References Cited

U.S. PATENT DOCUMENTS

| | | | |
|---|---|---|---|
| 11,016,964 B1* | 5/2021 | Hinegardner | G06F 16/2428 |
| 11,797,610 B1* | 10/2023 | Ferrucci | G06F 40/30 |
| 2018/0217976 A1* | 8/2018 | Hwang | G06F 40/242 |
| 2021/0133225 A1* | 5/2021 | Lin | G06F 16/3349 |
| 2022/0107802 A1* | 4/2022 | Rao | G06F 16/907 |
| 2024/0086489 A1* | 3/2024 | Sachindran | G06F 16/9574 |
| 2024/0104091 A1* | 3/2024 | Hamilton | G06F 16/9535 |

* cited by examiner

*Primary Examiner* — Michelle N Owyang
(74) *Attorney, Agent, or Firm* — Foley & Lardner LLP

(57) ABSTRACT

Systems and methods for a dual-pathway model that includes a deterministic word graph that operates in parallel with a semantic autocomplete model. The system generates outputs first using the deterministic word graph, and the system then uses the output of the deterministic word graph to determine whether to invoke the functionality of the semantic autocomplete model. By doing so, the semantic autocomplete model is used only sparingly, thus reducing aggregate latency in the system, but still allowing for increased scalability and customizability in the overall system as the deterministic word graph and the semantic autocomplete model may be updated and trained in parallel in the dual-pathway model.

20 Claims, 10 Drawing Sheets

SYSTEMS AND METHODS FOR GENERATING USER INPUTS USING A DUAL-PATHWAY MODEL

BACKGROUND

In recent years, the use of artificial intelligence, including, but not limited to, machine learning, deep learning, etc. (referred to collectively herein as artificial intelligence models, machine learning models, or simply models), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems.

First, artificial intelligence may rely on large amounts of high-quality data. The process for obtaining this data and ensuring its high quality can be complex and time-consuming. Additionally, data that is obtained may need to be categorized and labeled accurately, which can be a difficult and time-consuming task that may need to be performed manually. For example, generating meaningful and coherent text requires an understanding of language semantics, syntax, grammar, and context. Models need to comprehend the relationships between words, phrases, and sentences to produce accurate and contextually relevant text. In another example, language is often ambiguous, and resolving such ambiguity is critical for generating accurate and meaningful text. Ambiguities can arise from word sense disambiguation, pronoun resolution, or resolving context-dependent references. Generating text that aligns with the intended meaning requires effective ambiguity resolution techniques. In another example, avoiding repetitive or monotonous output is a challenge in text generation. Models may tend to generate generic or safe responses, lacking creativity or novelty. Ensuring diversity in generated text can involve exploring techniques such as controlling randomness, incorporating latent variables, or employing reinforcement learning to encourage exploration.

Finally, results based on artificial intelligence can be difficult to review as the process by which the results are made may be unknown or obscured. This obscurity can create hurdles for identifying errors in the results as well as improving the models providing the results. These technical problems may present an inherent challenge with attempting to use an artificial intelligence-based solution in generating content and/or anticipating user inputs.

SUMMARY

Systems and methods are described herein for novel uses and/or improvements to artificial intelligence applications. As one example, systems and methods are described herein for using an artificial intelligence-based solution in generating content and/or anticipating user inputs across different applications using a non-deterministic architecture.

For example, in view of the technical problems described above, conventional approaches to generating content and/or anticipating user inputs use a deterministic approach to generating content and/or suggesting user queries. In particular, conventional solutions use a deterministic word graph. A deterministic word graph, also known as a deterministic finite word automaton (DFA), is a mathematical model used to represent and process finite sets of words or strings. The deterministic word graph is a type of finite state machine (FSM) where each state transition is associated with a specific input symbol from a given alphabet.

While the deterministic word graph solution allows for low latency and quick responses, a deterministic word graph solution is not scalable to varying user inputs and is not customizable for specific users as the deterministic word graph requires manual updates and/or large amounts of training data, which are not available. To increase the scalability and/or customizability of the deterministic word graph, the systems and methods use a semantic autocomplete model to generate responses. However, a semantic autocomplete model raises new technical challenges.

As a first technical challenge, the semantic autocomplete model introduces additional latencies into the architecture that prevent the architecture from maintaining a low latency rate that is required for conversational responses. Accordingly, the systems and methods describe a dual-pathway model that includes a deterministic word graph which operates in parallel with the semantic autocomplete model. To overcome the latency rate issue with the semantic autocomplete model, the system generates outputs first using the deterministic word graph, and the system then uses the output of the deterministic word graph to determine whether to invoke the functionality of the semantic autocomplete model. That is, the trigger for whether to use the semantic autocomplete model is based on the output of the deterministic word graph (e.g., a prediction count). By doing so, the semantic autocomplete model is used only sparingly, thus reducing aggregate latency in this system, but still allowing for increased scalability and customizability in the overall system as the deterministic word graph and the semantic autocomplete model may be updated and trained in parallel in the dual-pathway model.

In some aspects, systems and methods for generating content based on dual-pathway models are described. For example, the system may receive user data. The system may determine, based on the user data, a first prediction count that a user has a first intent of a plurality of available intents using a first model of a dual-pathway model. The system may compare the first prediction count to a first threshold count for using a second model of the dual-pathway model. In response to the first prediction count equaling or exceeding the first threshold count, the system may select the first model from the dual-pathway model. The system may determine, using the first model, a first response for the first intent. The system may generate for display, on a user interface, a first potential user input corresponding to the first response, wherein the first potential user input comprises a first text string for entry into a search field of the user interface.

As a second technical challenge, a dual-pathway model featuring both a deterministic word graph and a semantic autocomplete model introduces a compatibility issue if outputs from the deterministic word graph and the semantic autocomplete model are to be used in concert. Because of this compatibility issue, conventional system would not rely on the outputs of the deterministic word graph to affect the outputs (and/or use thereof) of a semantic autocomplete model. However, embodiments of the present disclosure nonetheless use outputs from the deterministic word graph to trigger whether the semantic autocomplete model is used. To overcome the compatibility issue, the dual-pathway model comprises models with distinct structures and output mappings. For example, the deterministic word graph (which comprises a first structure) comprises an output mapping based on the popularity of given outputs and inputs. As the first structure is deterministic, the first structure is assured to generate an output for a given response. Even in cases with low input popularity (e.g., instances with uncommon inputs), the first structure succeeds in generating an output as the popularity mapping maps the low input popularity to at least one output and/or a trigger for the input for the semantic autocomplete model (which comprises a second structure). As the semantic autocomplete model is non-deterministic, the second structure generates an output based on computing a confidence of a given response, thus ensuring that all inputs return an output.

In some aspects, systems and methods for selecting outputs from dual-pathway models based on model-specific criteria are described. For example, the system may receive user data of a user interacting with a user interface. The system may generate a first feature input based on the user data. The system may process the first feature input through a first model of a dual-pathway model to generate a first output, wherein the first model comprises a deterministic word graph that generates outputs based on respective popularities of combinations of different text characters. The system may determine whether the first output corresponds to a first criterion specific to the first model. In response to determining that the first output does not correspond to the first criterion, the system may generate a second feature input based on the user data. The system may process the second feature input through a second model of the dual-pathway model to generate a second output, wherein the second model comprises a semantic autocomplete model that generates outputs based on predicted confidences. The system may determine whether the second output corresponds to a second criterion specific to the second model. The system may, in response to determining that the second output does correspond to the second criterion, determine that the user has a first intent of a plurality of intents. The system may determine a first response for the first intent.

As a third technical challenge, the dual-pathway model uses different algorithmic structures (e.g., one structure based on a popularity map and one based on a ordered map and/or dictionary that is sorted by a confidence score). As such, each structure produces outputs that are not directly comparable to the outputs of the other structure. Thus, there is no mechanism for directly ranking the accuracy of these outputs to each other. This poses a problem for generating dynamic conversational responses as there is limited space for populating multiple responses. To overcome this issue, the system clusters potential responses into a plurality of ranked intent clusters. For example, each intent cluster may comprise similar specific-intents. The system then selects the highest-ranked intent from each of the plurality of ranked intent clusters until the available space for population is full. By doing so, the system ensures the widest spectrum of potential intents from the dual-pathway model.

In some aspects, systems and methods for generating cluster-based outputs from dual-pathway models are described. For example, the system may receive user data of a user interacting with a user interface. The system may determine, based on a first output of a first model of a dual-pathway model, a first plurality of intent clusters corresponding to the user using a second model of a dual-pathway model, wherein the first plurality of intent clusters comprise respective sets of ranked intents, and wherein each respective set of the respective sets of ranked intents corresponds to one intent cluster of the first plurality of intent clusters. The system may generate, using the second model, a first intent subset comprising a highest-ranked intent in each of the respective sets of ranked intents. The system may determine a first number of intents in the first intent subset. The system may determine a first number of required intents for display in the user interface. The system may determine whether the first number of intents corresponds to the first number of required intents. The system may, in response to determining that the first number of intents corresponds to the first number of required intents, generate for display, on a user interface, a first set of responses that correspond to the first intent subset, respectively.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
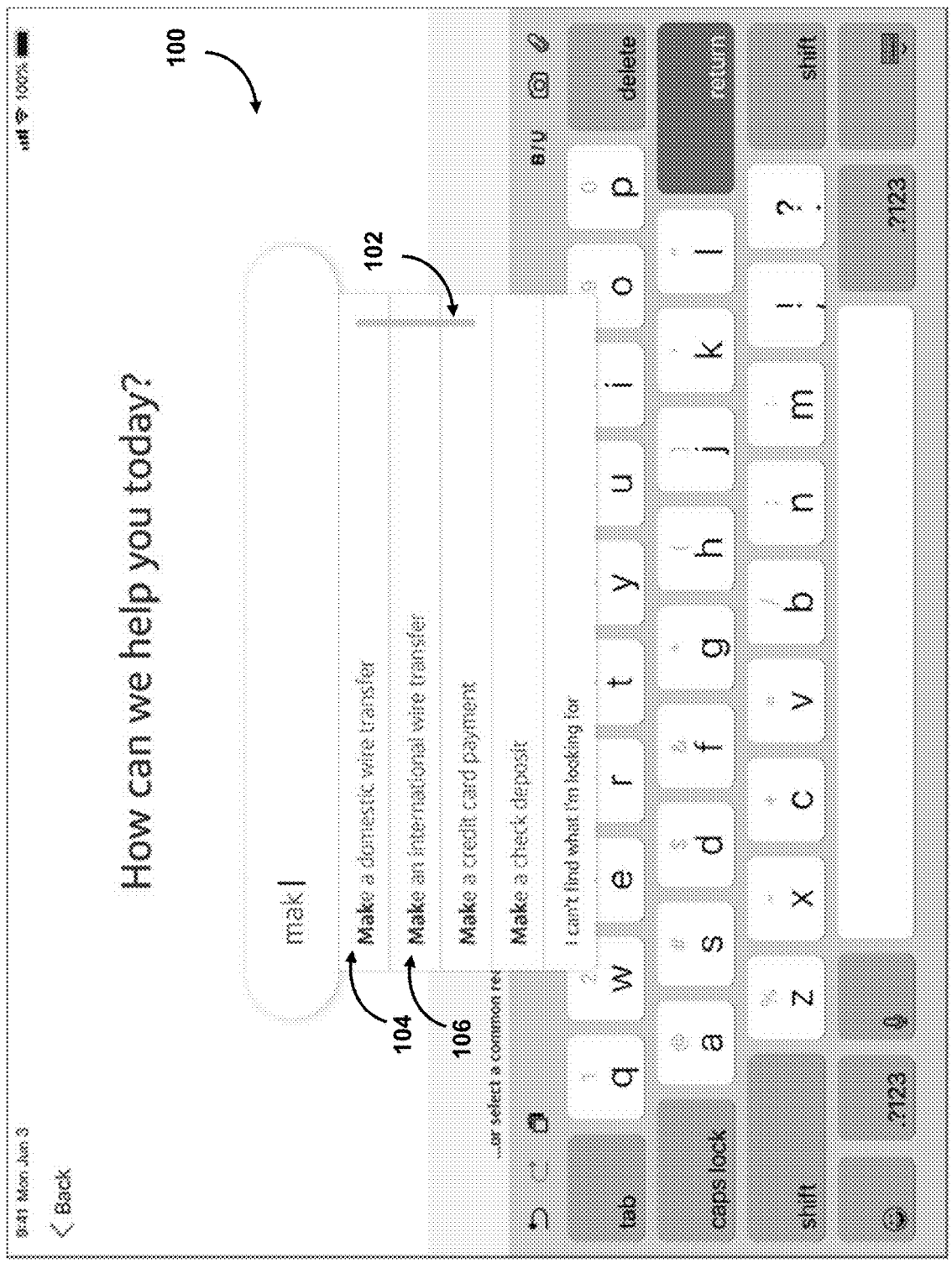
FIGS. 1A-B show illustrative diagrams for dynamically generating content, in accordance with one or more embodiments.
Figure 1B:
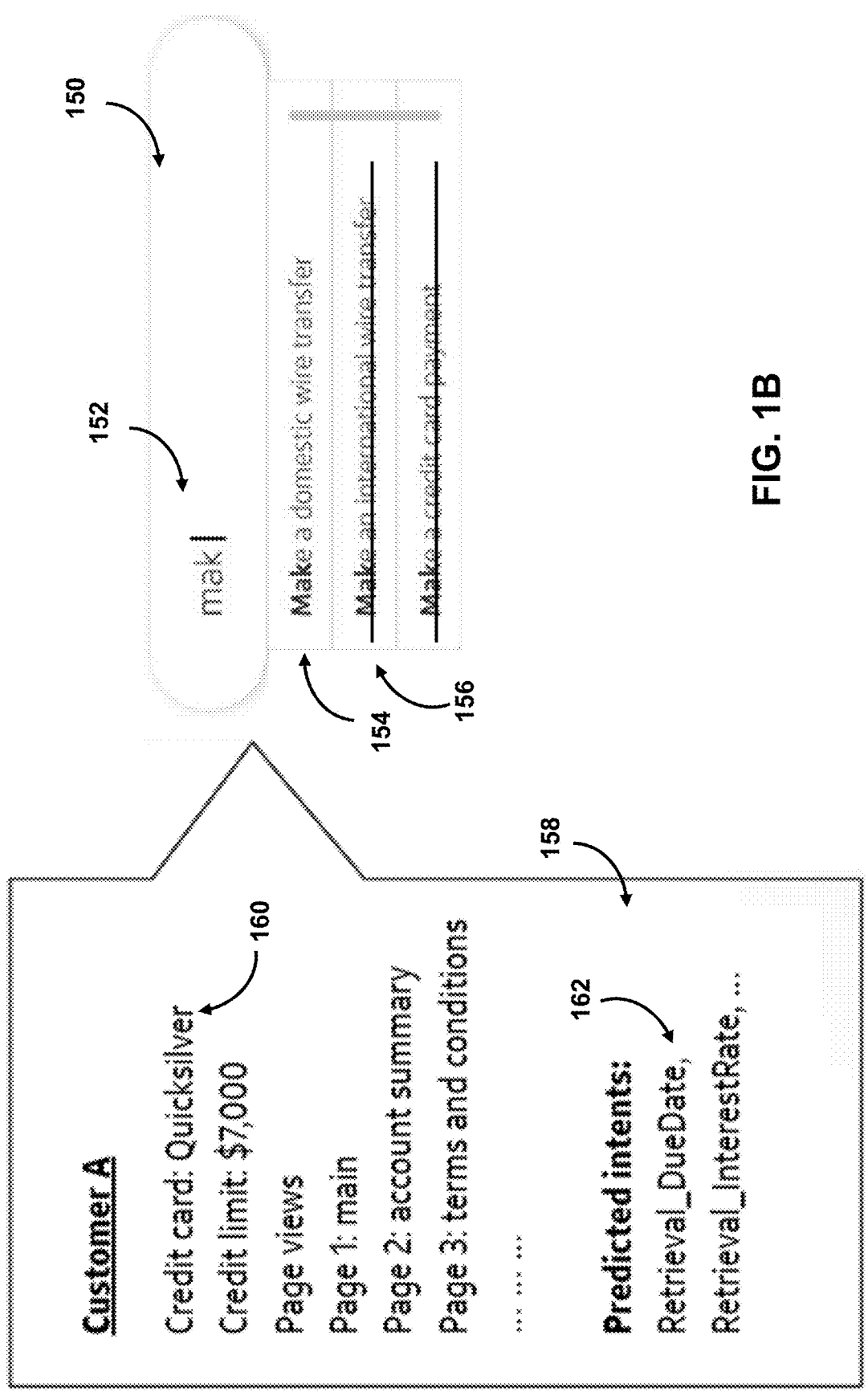

FIGS. 1A-B show illustrative diagrams for dynamically generating content, in accordance with one or more embodiments. For example, FIG. 1A shows an illustrative user interface for presenting dynamic responses, in accordance with one or more embodiments. As referred to herein, a "user interface" may comprise a human-computer interaction and communication in a device, and may include display screens, keyboards, a mouse, and the appearance of a desktop. For example, a user interface may comprise a way a user interacts with an application or a website. The system (e.g., a mobile application, an in-store terminal, etc.) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more media (e.g., text, video, audio, etc.).

Alternatively or additionally, the system may generate content through an autocomplete feature as shown in FIG. 1A. For example, autocomplete is a feature used in text-based applications, search engines, and/or text editors that helps users complete words or phrases as they type. When a user starts typing, the autocomplete feature suggests or predicts the rest of the word or phrase based on the input provided to save time and reduce typing effort by offering a list of possible completions. In some embodiments, autocomplete functionality relies on algorithms that analyze a variety of data sources, such as previous user inputs, popular search queries, and other relevant information. These algorithms generate predictions based on patterns and statistical probabilities. The suggested completions typically appear in a dropdown menu (e.g., dropdown 102) or a list below the input field, and users can select one of the suggestions (e.g., response 104) to complete their input.

In order to maintain the interaction, the system may need to generate responses dynamically and/or in substantially real time. As described herein, a "response" may comprise an output or reaction provided by a computer system in response to a given input or request. For example, the response may be based on the way in which a computer program or algorithm processes the provided information and generates an appropriate output. Responses may take various forms depending on the context and the type of system being used. They can range from simple text messages or notifications displayed on a screen to more complex actions performed by the computer, such as calculations, data processing, file operations, or even physical control of external devices. In the context of conversational agents or chatbots, computer responses are the messages or replies generated by a model based on the input or query provided by the user. These responses may be designed to simulate human-like interaction and provide meaningful and relevant information or assistance.

A response may comprise and/or the system may generate various types of content. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user-generated content may include content created and/or consumed by a user. For example, user-generated content may include content created by another but consumed and/or published by the user.

The system may generate responses within the normal cadence of a conversation, within the time it takes a user to type a search into a search field, etc. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

Moreover, the response and/or a subset of responses may be based on an intent of a user. For example, the system may include a recommendation engine that recommends quick replies (QRs), or dynamic conversational responses. For example, the system may receive an output from a model and use the output to generate a dynamic conversational response. In some embodiments, the system may include a first response (e.g., response 104) and a second response (e.g., response 106). For example, each conversational response may correspond to a potential intent of the user. For example, the system may generate a subset of dynamic conversational responses from a plurality of dynamic conversational responses based on a determined intent of a user.

In some embodiments, the information (e.g., a user action) may include insights about users, provided to the application (e.g., via an application programming interface (API)) from one or more sources such as a qualitative or quantitative representation (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

In some embodiments, to generate a first feature input, determine a user action, interpret user data, and/or otherwise determine a user intent, the system may use a Bidirectional Encoder Representations from Transformers (BERT) language model for performing natural language processing. For example, the BERT model includes pre-training contextual representations including Semi-supervised Sequence Learning, Generative Pre-Training, Embeddings from Language Models (ELMo), and Universal Language Model Fine-Tuning (ULMFIT). Unlike previous models, BERT is a deeply bidirectional, unsupervised language representation, pre-trained using only a plain text corpus. Context-free models such as word2vec or GloVe generate a single word embedding representation for each word in the vocabulary, whereas BERT takes into account the context for each occurrence of a given word. For instance, whereas the vector for "running" will have the same word2vec vector representation for both of its occurrences in the sentences "He is running a company" and "He is running a marathon," BERT will provide a contextualized embedding that will be different according to the sentence. Accordingly, the system is better able to determine an intent of the user.

In some embodiments, the system may, additionally or alternatively, use ELMo. For example, ELMo is a deep contextualized word representation that models both (1) complex characteristics of word use (e.g., syntax and semantics) and (2) how these uses vary across linguistic contexts (i.e., to model polysemy). These word vectors may be learned functions of the internal states of a deep bidirectional language model (biLM), which may be pre-trained on a large text corpus. ELMos may be easily added to existing models and significantly improve the state of the art across a broad range of challenging natural language processing problems, including question answering, textual entailment, and sentiment analysis.

In some embodiments, the system may, additionally or alternatively, use ULMFIT. ULMFiT is a transfer learning technique for use in natural language processing problems, including question answering, textual entailment, and sentiment analysis. ULMFiT may use a long short-term memory (LSTM) in an artificial recurrent neural network (RNN) architecture. The LSTM may include a three-layer architecture that includes: general domain language model pre-training; target task language model fine-tuning; and target task classifier fine-tuning.

FIG. 1B shows an illustrative user interface for presenting dynamic responses based on multi-modal information, in accordance with one or more embodiments. The system may comprise a model that predicts an intent of a user based on user data. As referred to herein, user data comprises data about a user and/or data that may be used to determine an intent of a user. For example, the system may determine whether a customer intends to make a credit card payment. To do so, the system may monitor a first type of data (e.g., user input 152) and/or other types of data (e.g., user profile data 158) such as time-dependent user account information (e.g., the due date of a credit card bill, current account balances, etc.). For example, one type of data may include content entered by a user, whereas a second type of data may comprise a set of text pages, reflecting the contents of the Internet drive menu pages. The data type may also include a set of numerical and categorical values. The system may then translate the first type of data into data arrays of numbers using natural language processing. For example, in response to a user action, which in some embodiments may comprise a user logging on to an application that generates user interface 150, inputting a query into user interface 150, and/or a prior action (or lack thereof) by a user in reaction to a prior response generated by the system, the system may take one or more steps to generate responses and/or select a subset of responses.

The system may monitor content generated by the user to generate user profile data (e.g., user profile data 158). As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic (e.g., user characteristic 160). As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be a digital representation of a person's identity. For example, the system may generate data points such as demographic segments (age, gender, profession, household income), temporal aspects (time of day, season, events), geolocation, and other behavioral data during a device session in order to determine insights into the specifics of the context of usage of a particular digital product or service. The data in the user profile may be generated based on the system actively or passively monitoring. These steps may include retrieving data about the user, retrieving data from other sources, monitoring user actions, and/or other steps in order to generate a feature input (e.g., as discussed herein).

In some embodiments, to determine an intent (e.g., intent 162) of the user, the system may monitor the interfaces with which the user interacted to generate a first feature input. For example, the first feature input may be based on one or more types of data. For example, the data may include data that describes an image currently or previously found in a user interface and/or characteristic, circumstances, and/or users related to the user interface. For example, the system may monitor user action data that may include user interactions in the user interfaces during a device interface session with the user. The device interface session may include a back-and-forth exchange of ideas and information between the system and the user. The device interface session may proceed through one or more media (e.g., text, video, audio, etc.). For example, when a user engages with a device, the user may multitask between various applications and/or websites. The user may enter and exit device sessions and/or may perform user actions during these device sessions. Each of these engagements with the device may comprise a device session.

The system may also use additional or alternative data to generate the first feature input. The system may receive a first user action (e.g., a user action interacting with user interface 100) from a first user, during a device interface session. The system may then retrieve time-dependent user account information for the first user during the device interface session with the one or more user interfaces. For example, time-dependent user account information may comprise user account information that changes and/or is based on time increments. For example, time-dependent user account information may comprise information on frequency of an account update, information on an account status, and/or information on an account value. In some embodiments, the feature input may include a vector that describes various information about a user, a user action, and/or a current or previous interaction with the user. The system may further select the information for inclusion in the feature input based on a predictive value. The information may be collected actively or passively by the system and compiled into a user profile.

In some embodiments, a first type of data (e.g., a user action) may include conversation details such as information about a current session, including a channel or platform, e.g., desktop web, iOS, mobile device, a launch page (e.g., the webpage that the application was launched from), a time of launch, or activities in a current or previous session before launching the application (as described above in relation to the user interface image data). The system may store this information, and all the data about a device interface session may be available in real time via HTTP messages and/or through data streaming from one or more sources (e.g., via an API).

In some embodiments, a second type of data (e.g., time-dependent information) may include user account information, such as types of accounts the user has; other accounts on file, such as bank accounts for payment; and information associated with accounts, such as credit limit, current balance, due date, recent payments, and recent transactions. The system may obtain this data in real time for model prediction through enterprise APIs.

In some embodiments, the types of information (e.g., user actions and/or time-dependent information) may include insights about users, provided to the application (e.g., via an API) from one or more sources such as a qualitative or quantitative representation (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

For example, the system may include different supervised and unsupervised machine learning models and human-devised rules that may reflect accumulated domain expertise. Specifically, the system may include non-deep learning classification models that may include, but are not limited to, logistic regression and Naïve Bayesian. The system may include deep learning models that may include neural factorization machines, deep and wide models, and multimodal models. The system may also include sets of human-written rules.

In some embodiments, the system may process transaction data. For example, the record data may include a paper or electronic record containing information about the transaction, such as transaction amount, transaction number, transaction date and time, transaction type (deposit, withdrawal, purchase, or refund), type of account being debited or credited, card number, identity of the card acceptor (e.g., merchant/source, including source address, identification or serial number, and/or terminal (e.g., name from which the terminal operates)).

In some embodiments, transaction data may include other information as well. For example, information about a source (e.g., address) may be updated and/or correspond to a particular location, corporate headquarters, or other address for all transactions with the source. Likewise, time stamp information may be transmitted in different formats (or correspond to different time zones). Payment information may have slight variations due to fees charged by different system components. In such cases, the system may reconstitute the original charge made by the user based on exchange fee information.

In some embodiments, the transaction data may not be human readable. For example, network name data may not be human readable. That is, network name data is generated along with the proprietary security algorithms used by different system components, and this network name data may comprise a string of alphanumeric characters and/or other symbols that is used by each individual system component. The network name may be routinely encrypted, decrypted, and/or subject to different proprietary algorithms for generating and translating data such that its original data value (e.g., a name of a source if the value was even originally based on the name of the source) may be irretrievable. As a benefit to human users, some credit card issuers and banks may cleanse this data in order to make it human readable. That is, the credit card issuers and/or banks may apply a proprietary algorithm to make network name or other source data more human readable. In some embodiments, user interface image data may comprise information that represents the combination of linguistic and non-linguistic data models (e.g., as described below in relation to FIG. 3).

The system may use one or more types of data (e.g., user profile data 158) to generate responses. In some embodiments, the user profile data may be used to eliminate potential responses (e.g., response 156) from a subset of responses. For example, based on user input 152, the system may determine a subset of potential responses (e.g., response 154 and response 156). The system may then use information from user profile data 158 (e.g., user characteristic 160, intent 162, etc.) to select, filter, rank, and/or eliminate a response from the subset.

Figure 2A:
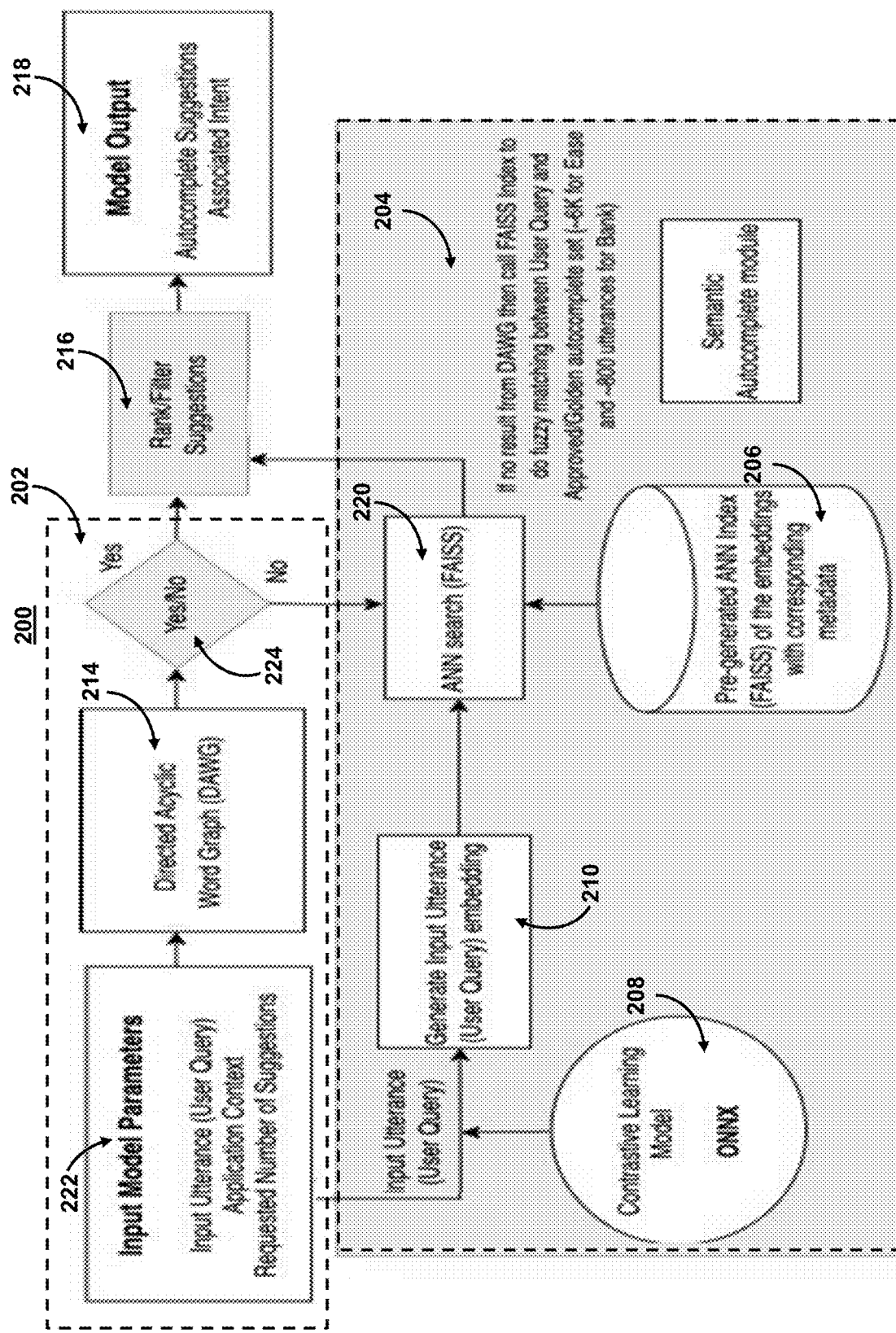
FIGS. 2A-D show illustrative diagrams for implementing dual-pathway models, in accordance with one or more embodiments.

FIGS. 2A-D show illustrative diagrams for implementing dual-pathway models, in accordance with one or more embodiments. FIG. 2A illustrates an architecture for a dual-pathway model. For example, system 200 may comprise a scalable autocomplete system, which uses an ensemble approach of a current word-graph system (e.g., model 202) and a combination of Siamese networks and approximate nearest neighbors search for producing semantic autosuggestions (e.g., model 204) based on user data (e.g., user inputs 222).

As a brief overview, the system (e.g., system 200) may comprise a contrastive learning model (e.g., a sentence transformer and online contrastive loss-hardness aware contrastive loss function) that is trained on utterance (e.g., chat) logs by creating pairs of similar and dissimilar utterance logs. The system may further fine-tune this model on the respective autocomplete dataset by creating pairs of similar and dissimilar suggestions from the autocomplete dataset. Because system 200 may have two application use cases, system 200 may have two sets of autocomplete dataset (e.g., corresponding to different end-user applications). The system may use these two models respectively to embed the two autocomplete datasets and thus create two embedding files for each application use case. The system may then train FAISS indexes respectively on each of the embedding files to create two embedding index files for the two use cases. The system may also convert the two embeddings files to ONNX files to optimize for latency.

For example, model 202 may comprise a rule-based model (e.g., model 214), built using a directed acyclic word graph (DAWG) and Levenshtein Edit Distance. The word graph may be pre-populated with the autocomplete pair dataset of suggestion and intent. The results are cached via LFU (least frequently used). This caching feature is built in within the library itself. In some embodiments, in order to encourage diversity of intents within the set of autocomplete suggestions for a request, an oversampling tactic is used.

For example, system 200 utilizes a vetted autocomplete dataset (e.g., dataset 206). To train model 204, the system utilizes a hardness-aware contrastive loss model (e.g., model 208). The system may tune model 204 on a database (e.g., database 210) of historic user inputs (e.g., input utterances). The system may then further tune model 204 based on the vetted autocomplete dataset (e.g., dataset 206). Because of a limited quantity of query results (e.g., historic user inputs) in the vetted dataset (e.g., dataset 206), the system may use a deep metric-based meta-learning application that fits the paradigm of long-tailed data. This approach may further help develop model 204 to learn semantic representations from low quantities of new data, which aids in rapidly servicing autocompletions for those new cases.

System 200 may then use this semantic model to create embeddings of the vetted autocomplete dataset (e.g., dataset 206) and further index these embeddings using a library (e.g., library 220) for efficient similarity search and clustering of dense vectors (e.g., FAISS) to achieve fast similarity search. For example, the library may by optimized for hash-based searches and provide more scalable similarity search functions.

In some embodiments, latency of inference is one of the biggest constraints in an autocomplete system (e.g., system 200). To achieve low latency of inference, system 200 utilizes performance optimization techniques and converts the PyTorch model to ONNX format (e.g., an open-source artificial intelligence ecosystem of technology companies and research organizations that establish open standards for representing machine learning algorithms and software tools to promote innovation and collaboration in the artificial intelligence sector).

System 200 includes a combiner module that effectively combines the autocomplete suggestions from both word-graph (e.g., model 202) and the semantic model sub-components (e.g., comprising model 204). By doing so, the system displays relevant suggestions (e.g., responses based on specific intents) even when a word-graph system (e.g., model 202) has no results. The results further show that with perturbations in user input (typos, mis-formatting, etc.), system 200 is still able to autocomplete with relevant semantic suggestions wherever applicable. System 200 is semantically robust and may generate personalized autocomplete experiences for customer contextual features like page-views, account_card_type, and customer feedback features like clicked/no-clicked suggestions, customer intent associated with the suggestions, etc.

For example, system 200 may receive determinations of intent from model 202 and model 204. For example, system 200 may determine whether model 204 has generated a threshold number of intents, responses, etc. at layer 224. System 200 may then rank and/or filter the determinations of intent (e.g., suggestions/responses corresponding to specific intents) at combiner 216 prior to outputting the determinations at output 218.

Figure 2B:
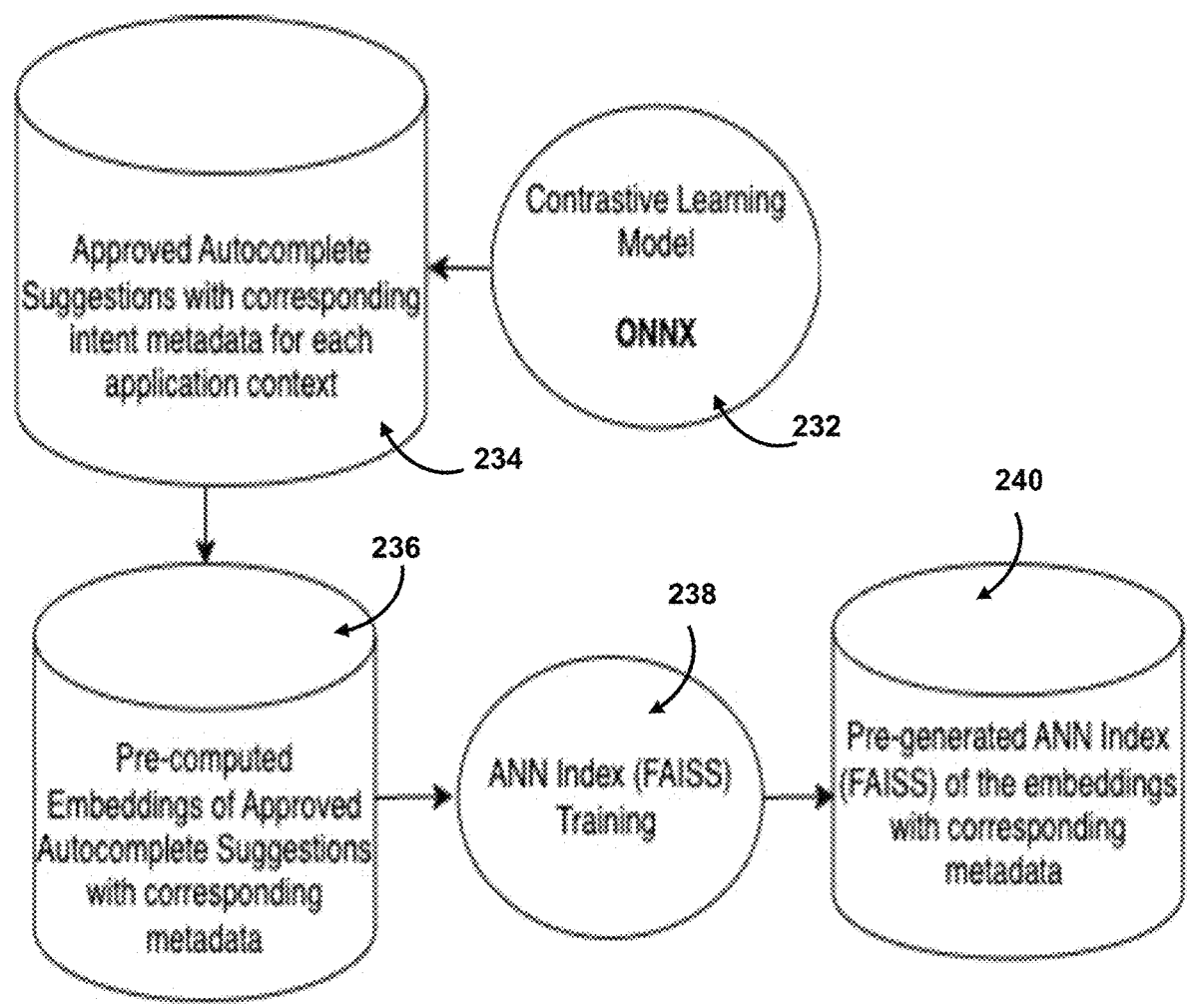

FIG. 2B illustrates a diagram for generating a library for high-dimensional data similarity search and clustering. For example, FIG. 2B includes contrastive learning model 232. Contrastive learning model 232 may comprise a self-supervised model (e.g., that is machine learning and/or deep learning based). Contrastive learning model 232 may learn useful representations of data by contrasting similar and dissimilar examples.

The goal of contrastive learning model 232 may be to encode data samples in such a way that similar samples are represented closer to each other while dissimilar samples are represented farther apart in the learned feature space. Contrastive learning model 232 may achieve this by maximizing agreement between positive pairs (similar examples) and minimizing agreement between negative pairs (dissimilar examples). For example, contrastive learning model 232 may create pairs of samples (e.g., using data augmentation techniques), where one sample is considered a positive example and the other sample is considered a negative example. Contrastive learning model 232 may then map the positive pair closer together and the negative pair farther apart in the feature space.

Contrastive learning model 232 may use approved autocomplete suggestions (e.g., specific intents) with corresponding intent metadata for each application context (e.g., cluster assignments, application-specific uses and/or terms, etc.) from database 234. For example, contrastive learning model 232 may be run on autocomplete suggestions to create embeddings in database 236. As referred to herein, an "application context" refers to the environment or set of circumstances in which a computer application operates. It may encompass various factors and conditions that can influence the behavior, functionality, and/or usage of an application. The application context includes elements such as the hardware and software infrastructure on which the application runs, the operating system and its configuration, the network environment, and any specific dependencies or requirements of the application.

The system may then generate database 236, which may comprise pre-computed embeddings of approved autocomplete suggestions with corresponding metadata. For example, the system may generate an embedding of data in database 234. An embedding of data refers to a mathematical representation or transformation of raw data into a lower-dimensional vector space. The purpose of an embedding is to capture and encode meaningful information or patterns present in the data in a more compact and structured format.

In some embodiments, database 236 may comprise word embeddings used to represent words or phrases as dense vectors in a continuous space. Techniques like word2vec, GloVe, and fastText learn word embeddings by analyzing large text corpora, capturing semantic and syntactic relationships between words. Database 236 may comprise image embeddings that represent images as fixed-length vectors in a lower-dimensional space. Convolutional Neural Networks (CNNs) are commonly used to extract image embeddings by training deep learning models on large image datasets. Database 236 may comprise graph embeddings that are used to represent graph-structured data, such as social networks or knowledge graphs, as low-dimensional vectors. Graph neural networks and techniques like GraphSAGE, node2vec, and Graph Convolutional Networks (GCNs) are commonly employed to learn meaningful graph embeddings.

Data from database 236 may then be used for index training. For example, index 240 may be generated based on training 238. Index 240 may comprise an open-source library designed for efficient similarity search and nearest neighbor search tasks. While FAISS itself is not an artificial neural network (ANN), it can be used in conjunction with ANNs for efficient retrieval and indexing.

FAISS is primarily focused on large-scale similarity search problems, where the goal is to find similar items or vectors within a massive dataset. It provides optimized algorithms and data structures to accelerate search operations, enabling fast retrieval of nearest neighbors. FAISS offers several index structures, including the Inverted File, Product Quantization, and Hierarchical Navigable Small World (HNSW) indexes. These indexes are designed to efficiently handle high-dimensional data and enable fast search operations by leveraging techniques such as quantization, clustering, and graph-based search. When used with ANNs, FAISS can be employed to build and index embeddings or feature vectors produced by the neural network models. This allows for quick retrieval of similar vectors or nearest neighbors in large-scale datasets, making it useful for applications such as image recognition, natural language processing, recommender systems, and more.

Figure 2C:
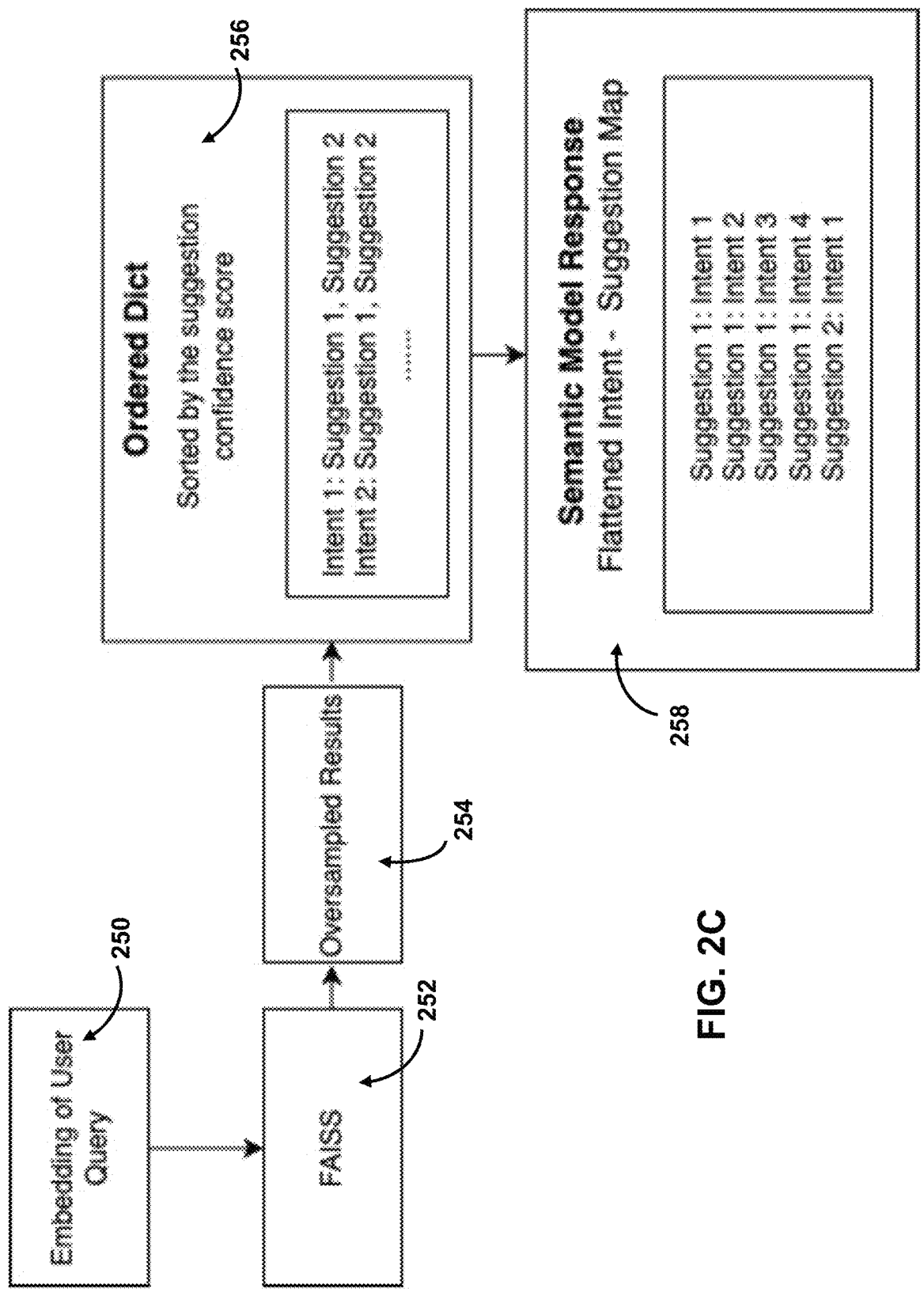

FIG. 2C illustrates a diagram for clustering intents. For example, at point 252, the system may receive an embedding of user query 250. For example, the embedding may correspond to embedding from database 236 (FIG. 2B). The embeddings may then be input into index embeddings or feature vectors produced by the neural network models at point 254. The system may then mitigate issues will low amounts of training data by oversampling. For example, oversampling is a technique used in machine learning to address class imbalance in a dataset. Class imbalance occurs when the number of instances in one class is significantly lower than the number of instances in the other class(es). This can lead to biased models that perform poorly on the minority class. When faced with class imbalance, oversampling involves generating synthetic or duplicate examples from the minority class to increase its representation in the training dataset. This can help to provide a more balanced distribution between the classes and mitigate the impact of class imbalance on model performance. In some embodiments, the system may include random oversampling, which involves randomly selecting examples from the minority class, with replacement, and adding them to the training dataset.

In some embodiments, the system may use oversampling to achieve intent diversity in specific intents (e.g., suggestions). For example, the system may want to show suggestions to the users that belong to diverse intents. To achieve this, the system oversamples the number of suggestions that are output from the model. The system may use an oversample ratio of 20. For example, if the number of suggestions passed in the API by a client is 5, then using an oversampling ratio of 20, the system gets 100 suggestions from the model. The system may then bucket these suggestions using the intent metadata associated with each suggestion, by creating an ordered dictionary with key (e.g., an intent) and values (e.g., specific intents and/or suggestions that are sorted by the suggestions confidence score. Then the system may loop through the keys of the ordered dictionary and take the first suggestion from each intent key, until the system has reached the required number of suggestions (e.g., required prediction count) passed by the client or have exhausted going through all the keys. If the system has not reached the required number of suggestions parameter (e.g., a threshold prediction count), and has exhausted going through all the keys, then the system may loop through the keys again but this time take the second suggestion from each key if available.

The system may use random oversampling, which involves randomly duplicating instances from the minority class to increase its frequency in the dataset. The system may use Synthetic Minority Oversampling Technique (SMOTE), which creates synthetic examples by interpolating between existing minority class instances. This may generate new examples by taking the feature vectors of a minority class instance and combining them with the feature vectors of its nearest neighbors. The system may use Adaptive Synthetic (ADASYN) sampling, which is an extension of SMOTE that assigns different weights to the minority class instances based on their difficulty in learning, allowing for more emphasis on difficult-to-learn examples.

The system may then generate intent clusters at point 256. For example, the system may use probabilistic programming. For example, probabilistic programming is a programming paradigm in which probabilistic models are specified and inference for these models is performed automatically. The system may also utilize the distributions generated over possible model outcomes to determine prediction confidences. For example, the system may use a prediction confidence ("prediction_confidence").

The prediction confidence may be a confidence interval of a prediction that likely contains the mean value of the dependent variable given specific values of the independent variables. For example, a prediction confidence may be assigned to a potential intent, goal, and/or objective of a user. The system may determine the prediction confidence for each intent, goal, and/or objective and compare the respective prediction confidence to an intent confidence threshold ("intent_threshold"). The intent confidence threshold may be a threshold confidence required for the system to determine that a user has an intent corresponding to the prediction confidence. It should be noted that each intent may have a different confidence threshold. For example, the system may compare the first prediction confidence to a first threshold confidence. In some embodiments, the system may determine a threshold confidence based on one or more criteria. For example, the system may determine an accuracy metric for the first model and determine the first threshold confidence based on the accuracy metric. For example, if the system determines that the model used to determine the first prediction confidence is more accurate, the system may set a lower threshold confidence for selecting a model to generate a response. In contrast, if the system determines that the model used to determine the first prediction confidence is less accurate, the system may set a higher threshold confidence for selecting a model to generate a response.

In some embodiments, the system may determine a number of the plurality of available intents in which a corresponding prediction confidence equals or exceeds the first threshold confidence. For example, the system may determine whether a threshold number of responses (e.g., 1, 2, 3, 5, etc.) that have a respective prediction confidence can be generated using the first model. The system may then determine whether to use a second model to generate one or more responses based on whether the threshold number is met. In some embodiments, the threshold number may be zero (i.e., the system determines whether the first model may be used to generate any responses). Alternatively or additionally, the system may determine the threshold number based on the user device type of the user device on which the user interface is displayed. For example, the user device type may correspond to a smartphone or other device with a limited screen size. As such, the system may determine that fewer responses are needed (i.e., due to screen space limitations). Alternatively, the system may determine that the user device type is a desktop computer, which has ample screen space and for which numerous responses may be generated.

For example, the system may determine a number of the plurality of available intents in which a corresponding prediction confidence equals or exceeds the first threshold confidence. The system may then compare the number to a threshold number. The system may then determine to select the first model based on the number exceeding the threshold number, wherein the threshold number is zero. Alternatively or additionally, the system may determine a threshold number based on a user device type of a user device on which the user interface is displayed. The system may then compare the number to the threshold number. The system may then determine to select the first model based on the number exceeding the threshold number.

In order to determine the likely intent and generate a response that is both timely and pertinent, the system may use one or more models that are trained to first determine an intent cluster and then determine an intent from the cluster. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, similar intents (e.g., a first intent of a user to learn his/her maximum credit limit and a second intent of a user to learn a current amount in his/her bank account) may have similar feature inputs as much of the underlying aggregated information may be the same. Moreover, training data for a model (e.g., known historical intents and labeled feature inputs) may be sparse. Accordingly, determining a specific intent of a user with a high level of precision is difficult, even when using a machine learning model.

To overcome these technical challenges, the system may include a model, wherein the model is trained to cluster a plurality of specific intents into a plurality of intent clusters. As opposed to manually grouping potential intents, the system trains a model to identify common user queries that correspond to a group of intents. Accordingly, the system may generate intent clusters that provide access to specific intents and may be represented (e.g., in a user interface) by a single option. For example, FIG. 2C includes component 258, labeled Semantic Model Response. The system may also train a model to select a subset of the plurality of intent clusters from the plurality of intent clusters based on a first feature input, wherein each intent cluster of the plurality of intent clusters corresponds to a respective intent of a user following the first user action. For example, the system may need to limit the number of options that appear in a given response (e.g., based on a screen size of a user device upon which the user interface is displayed). Accordingly, the model may be trained to select a subset of the plurality of intent clusters to be displayed.

For example, as opposed to determining a specific intent of a user, which may be difficult due to the sparseness of available information as well as the particularities of an individual user, the system instead attempts to select a group of intent clusters (e.g., each cluster corresponding to a plurality of specific intents). Each specific intent within the group of intent clusters may correspond to an option in a response. For example, by selecting a response, the user may access further responses for individual specific intents within the cluster. Accordingly, the system relies on the user to select the specific intent that is appropriate, and instead the system is trained to select the intent clusters. While counterintuitive, this approach leads to better results as the number of false positives (i.e., suggesting a specific intent of the user that is incorrect) is reduced. Moreover, as opposed to training a model to rank specific intents and then grouping the specific intents based on the ranking, which leads to all likely relevant specific intents being located in a single cluster (i.e., represented by a single response), the system allows for likely specific intents to be dispersed throughout the displayed options.

Figure 2D:
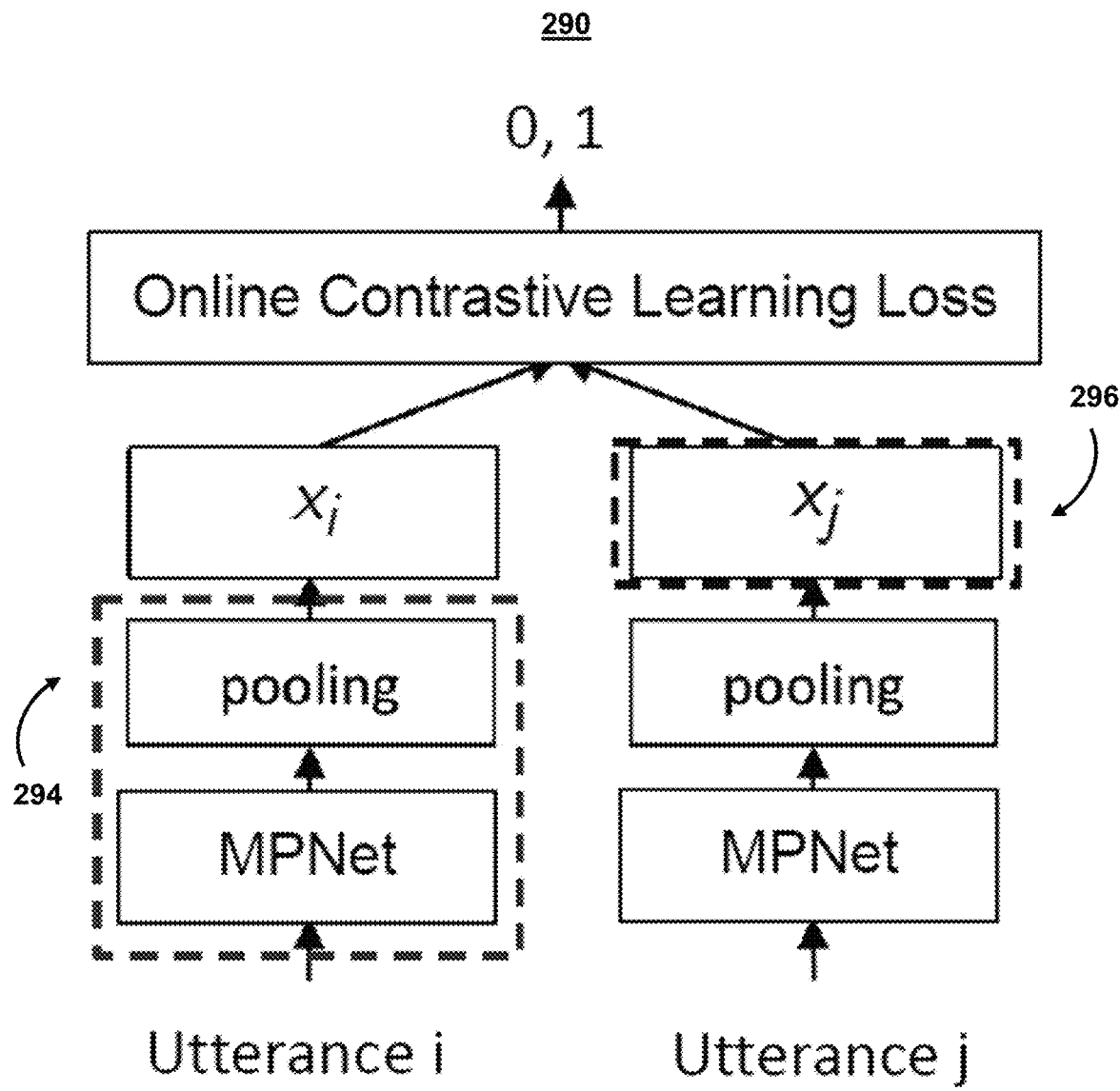

FIG. 2D illustrates a diagram for a Siamese network model utilizing hardness-aware contrastive loss. For example, model 290 may be used as a sentence transformer for online contrastive loss. For example, model 290 may comprise a contrastive learning model. Model 290 may use algorithm 292. For example, algorithm 292 may comprise a contrastive loss function, such as InfoNCE (Normalized Mutual Information Neural Estimation) loss or NT-Xent (Normalized Temperature-scaled Cross Entropy) loss, to measure the agreement between pairs of examples. By optimizing this loss function, model 290 can learn meaningful representations that capture the underlying structure and similarities within the data. Model 290 may include trainable portion 294 and embedding 296.

Figure 3:
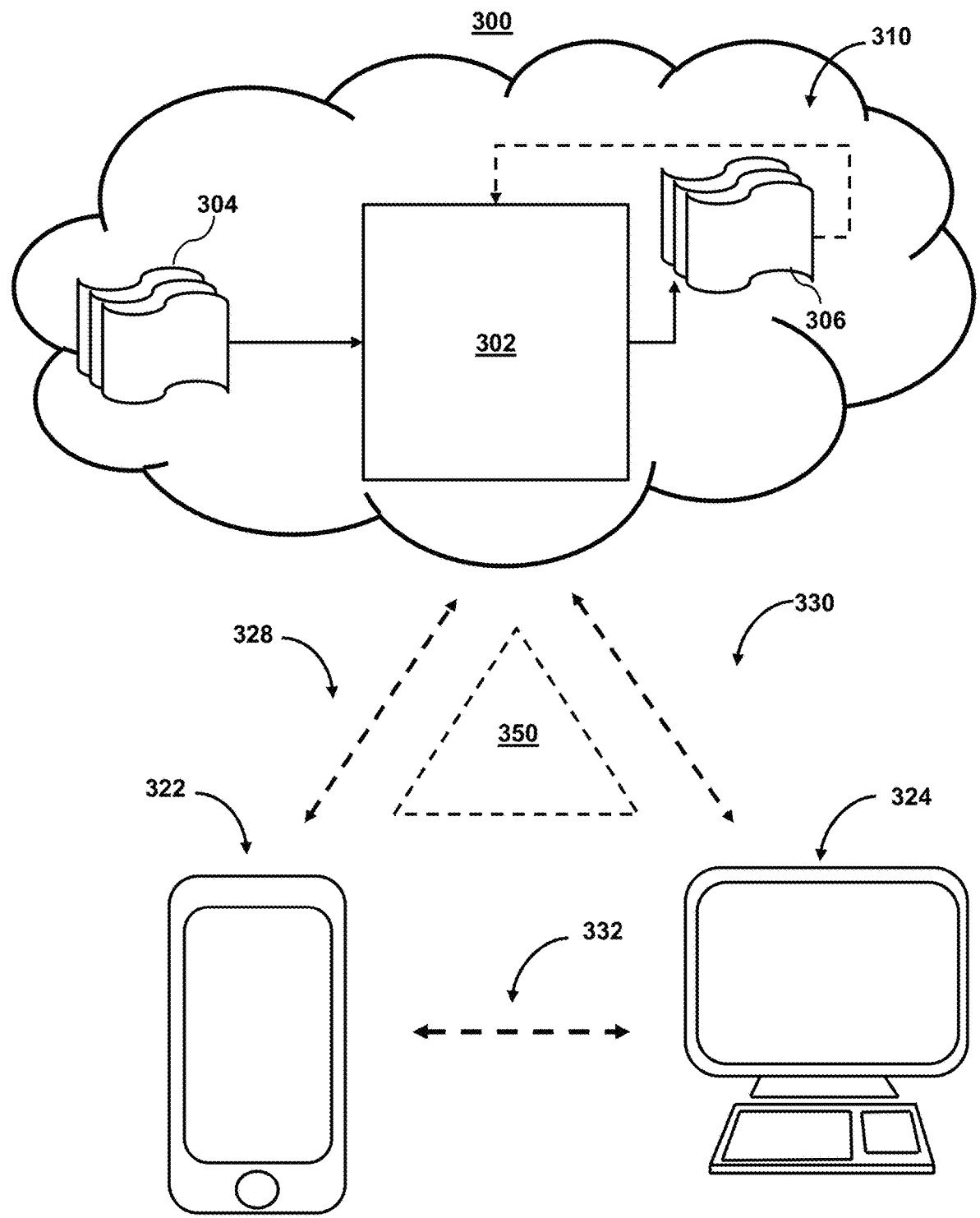
FIG. 3 shows illustrative components for a system used to generate content based on dual-pathway models, in accordance with one or more embodiments.

FIG. 3 shows illustrative components for a system used to generate content based on dual-pathway models, in accordance with one or more embodiments. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include model 302, which may be a machine learning model, artificial intelligence model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an ANN. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether a given input corresponds to a classification of model 302. In some embodiments, the model (e.g., model 302) may automatically perform actions based on outputs 306. In some embodiments, the model (e.g., model 302) may not perform any actions.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open-source API platforms and their models. API layer 350 may use a developer portal. API layer 350 may use strong security constraints applying WAF and DDOS protection, and API layer 350 may use RESTful APIs as standard for external integration.

Figure 4:
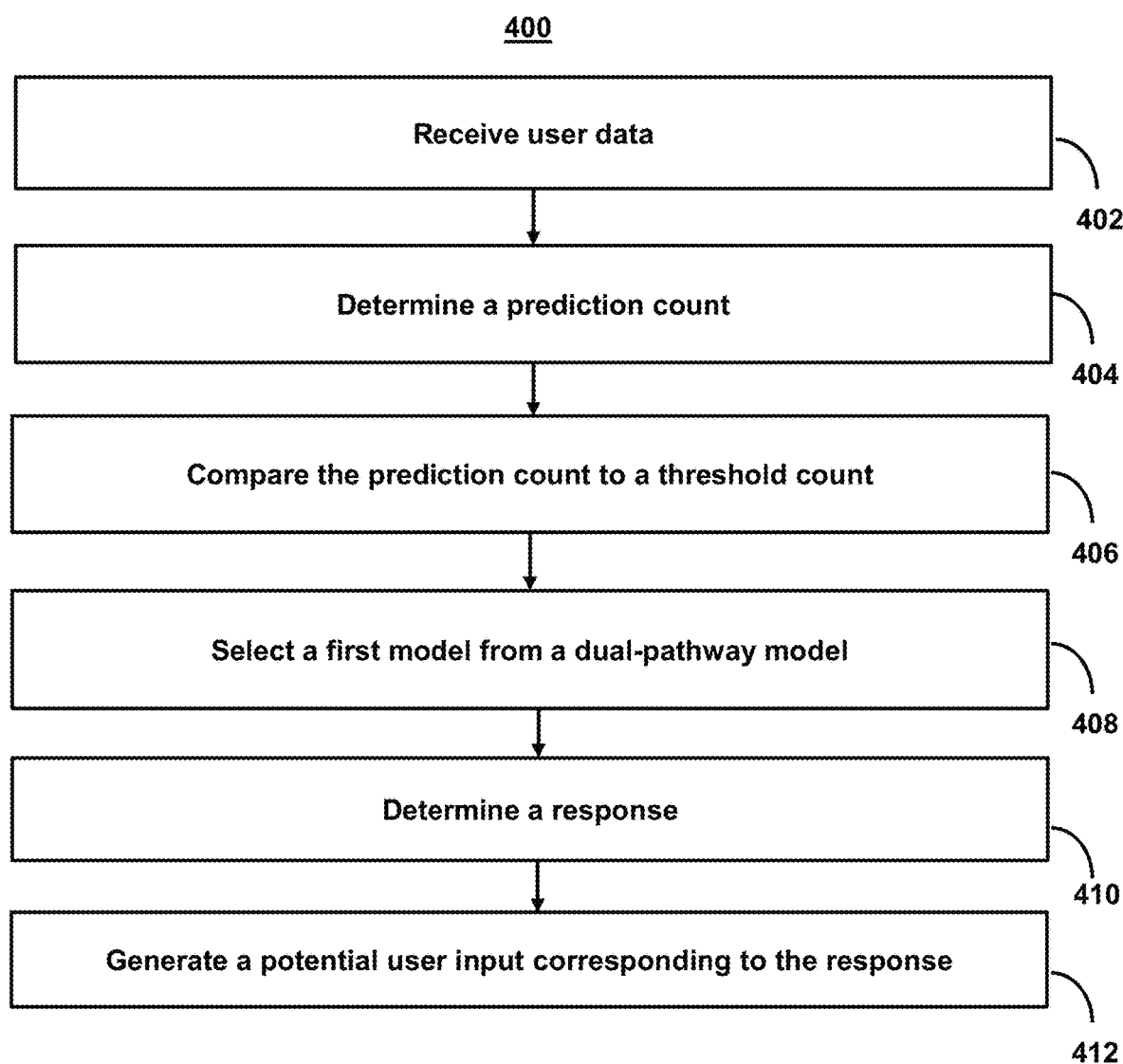
FIG. 4 shows a flowchart of the steps involved in generating user inputs using a dual-pathway model, in accordance with one or more embodiments.

FIG. 4 is a flowchart of the steps involved in generating user inputs using a dual-pathway model, in accordance with one or more embodiments. For example, the system may use process 400 (e.g., as implemented on one or more system components) in order to generate responses corresponding to potential user inputs using a dual-pathway model that comprises two subnetworks. In some embodiments, process 400 may use a semantic autocomplete model, which may introduce additional latencies into the model architecture and prevent the architecture from maintaining a low latency rate that is required for conversational responses. Accordingly, the system may use a dual-pathway model that includes a deterministic word graph which operates in parallel with the semantic autocomplete model. To overcome the latency rate issue with the semantic autocomplete model, the system generates outputs first using the deterministic word graph, and the system then uses the output of the deterministic word graph to determine whether to invoke the functionality of the semantic autocomplete model. That is, the trigger for whether to use the semantic autocomplete model is based on the output of the deterministic word graph. By doing so, the semantic autocomplete model is used only sparingly, thus reducing aggregate latency in this system, but still allowing for increased scalability and customizability in the overall system as the deterministic word graph and semantic autocomplete model may be updated and trained in parallel in the dual-pathway model.

At step 402, process 400 (e.g., using one or more components described herein) receives user data. For example, the system may receive user data in response to a user interacting with a user interface. The user data may describe one or more characteristics about a user, a user device, and/or one or more interactions of the user with a user device and/or application generating responses. In some embodiments, the system may generate a feature input (e.g., for input into a model). For example, the system may generate a feature input based on the user data, input the feature input into a first model, and receive an output from the first model, wherein the output comprises the first prediction count. For example, the feature input may comprise a column of data (e.g., an input set) that represents characteristics of user data which the system may use to select a conversational response. Alternatively or additionally, the system may include a feature input layer that receives the feature input and applies data normalization.

At step 404, process 400 (e.g., using one or more components described herein) determines a prediction count. For example, the system may determine, based on the user data, a first prediction count that a user has a first intent of a plurality of available intents using a first model of a dual-pathway model (e.g., the first model may comprise a deterministic word graph model and the second model may comprise a semantic autocomplete model).

In some embodiments, the system may determine a number of the plurality of available intents in which a corresponding prediction count equals or exceeds the first threshold count. For example, the system may determine whether a threshold number of responses (e.g., 1, 2, 3, 5, etc.) that have a respective prediction count can be generated using the first model. The system may then determine whether to use a second model to generate one or more responses based on whether the threshold number is met. In some embodiments, the threshold number may be zero (i.e., the system determines whether the first model may be used to generate any responses). Alternatively or additionally, the system may determine the threshold number based on the user device type of the user device on which the user interface is displayed. For example, the user device type may correspond to a smartphone or other device with a limited screen size. As such, the system may determine that fewer responses are needed (i.e., due to screen space limitations). Alternatively, the system may determine that the user device type is a desktop computer, which has ample screen space and for which numerous responses may be generated.

For example, the system may determine a number of the plurality of available intents in which a corresponding prediction count equals or exceeds the first threshold count. The system may then compare the number to a threshold number. The system may then determine to select the first model based on the number exceeding the threshold number, wherein the threshold number is zero. Alternatively or additionally, the system may determine a threshold number based on a user device type of a user device on which the user interface is displayed. The system may then compare the number to the threshold number. The system may then determine to select the first model based on the number exceeding the threshold number.

At step 406, process 400 (e.g., using one or more components described herein) compares the prediction count to a threshold count. For example, the system may compare the first prediction count to a first threshold count for using a second model of the dual-pathway model.

In some embodiments, the system may determine a threshold count based on one or more criteria. For example, the system may determine an accuracy metric for the first model and determine the first threshold count based on the accuracy metric. For example, if the system determines that the model used to determine the first prediction count is more accurate, the system may set a lower threshold count for selecting a model to generate a response. In contrast, if the system determines that the model used to determine the first prediction count is less accurate, the system may set a higher threshold count for selecting a model to generate a response.

Additionally or alternatively, the system may determine a frequency at which the user has the first intent and determine the first threshold count based on the frequency. For example, if the system determines that the user has the first intent more often, the system may set a lower threshold count for selecting a model to generate a response. In contrast, if the system determines that the user has the first intent less often, the system may set a higher threshold count for selecting a model to generate a response.

At step 408, process 400 (e.g., using one or more components described herein) selects a model from a dual-pathway model. For example, the system may, in response to the first prediction count equaling or exceeding the first threshold count, select the first model from the dual-pathway model.

In some embodiments, the system may select a model based on one or more criteria. For example, the system may determine an intent type and compare the intent type with listings of respective models that correspond to each intent type of the plurality of available intents to determine that the first model corresponds to the intent type. For example, a given model may be used for selecting an intent for users with a particular characteristic (e.g., credit check, bill pay, etc.).

At step 410, process 400 (e.g., using one or more components described herein) determines a response. For example, the system may determine, using the first model, a first response for the first intent. In some embodiments, the system may determine that a plurality of responses are required. However, in order to conserve processing time and/or power, the system may determine whether the responses are met based on a specific order. For example, the system may retrieve a plurality of responses for the first intent. The system may then determine a ranking for the plurality of responses. For example, the ranking may be based on the popularity of the intents. The system may then select to determine the first response based on the ranking.

At step 412, process 400 (e.g., using one or more components described herein) generates a response. For example, the system may generate for display, on a user interface, a first potential user input corresponding to the first response. For example, the first potential user input may comprise a first text string for entry into a search field of the user interface. The system may likewise generate additional responses. For example, the system may generate additional responses in response to a user response (e.g., simultaneously), or the system may generate additional responses in a series following a user response (e.g., one additional response after each response).

In some embodiments, the system may monitor for subsequent user inputs and maintain, filter, and/or remove potential user inputs based on these inputs. For example, the system may receive a first user input into the search field, wherein the first user input comprises a first textual character. The system may determine whether the first textual character corresponds to the first text string. In response to determining that the first textual character corresponds to the first text string, the system may continue to generate for display the first potential user input. Alternatively or additionally, the system may receive a first user input into the search field, wherein the first user input comprises a first textual character. The system may determine whether the first textual character corresponds to the first text string. The system may, in response to determining that the first textual character does not correspond to the first text string, end display of the first potential user input.

In some embodiments, the system may perform other functions based on user inputs. For example, the system may determine additional predictions. For example, the system may receive a first user input into the search field, wherein the first user input comprises a first textual character. The system may determine whether the first textual character corresponds to the first text string. In response to determining that the first textual character does not correspond to the first text string, the system may determine, based on the user data and the first user input, a second prediction count that the user has a second intent of a plurality of available intents using the first model. Additionally or alternatively, the system may determine the plurality of available intents using the first model. The system may then determine a respective prediction count for each of the plurality of available intents. The system may compare the respective prediction count for each of the plurality of available intents to the first threshold count.

In some embodiments, each of these responses may be generated based on a corresponding model. For example, the system may determine, based on the user data, a second prediction count that the user has a second intent of the plurality of available intents. The system may then compare the second prediction count to a second threshold count. The system may, in response to the second prediction count equaling or exceeding the second threshold count, select a second model from the dual-pathway model corresponding to a second intent type of the second intent. The system may determine, using the second model, a second response for the second intent. The system may determine, based on the user data, whether the second response is met. The system may, in response to the second response not being met, generate for display, on the user interface, a second potential user input corresponding to meeting the second response.

It is contemplated that the steps or descriptions of FIG. 4 may be used with any other embodiment of this disclosure.

In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to other embodiments could be used to perform one or more of the steps in FIG. 4.

Figure 5:
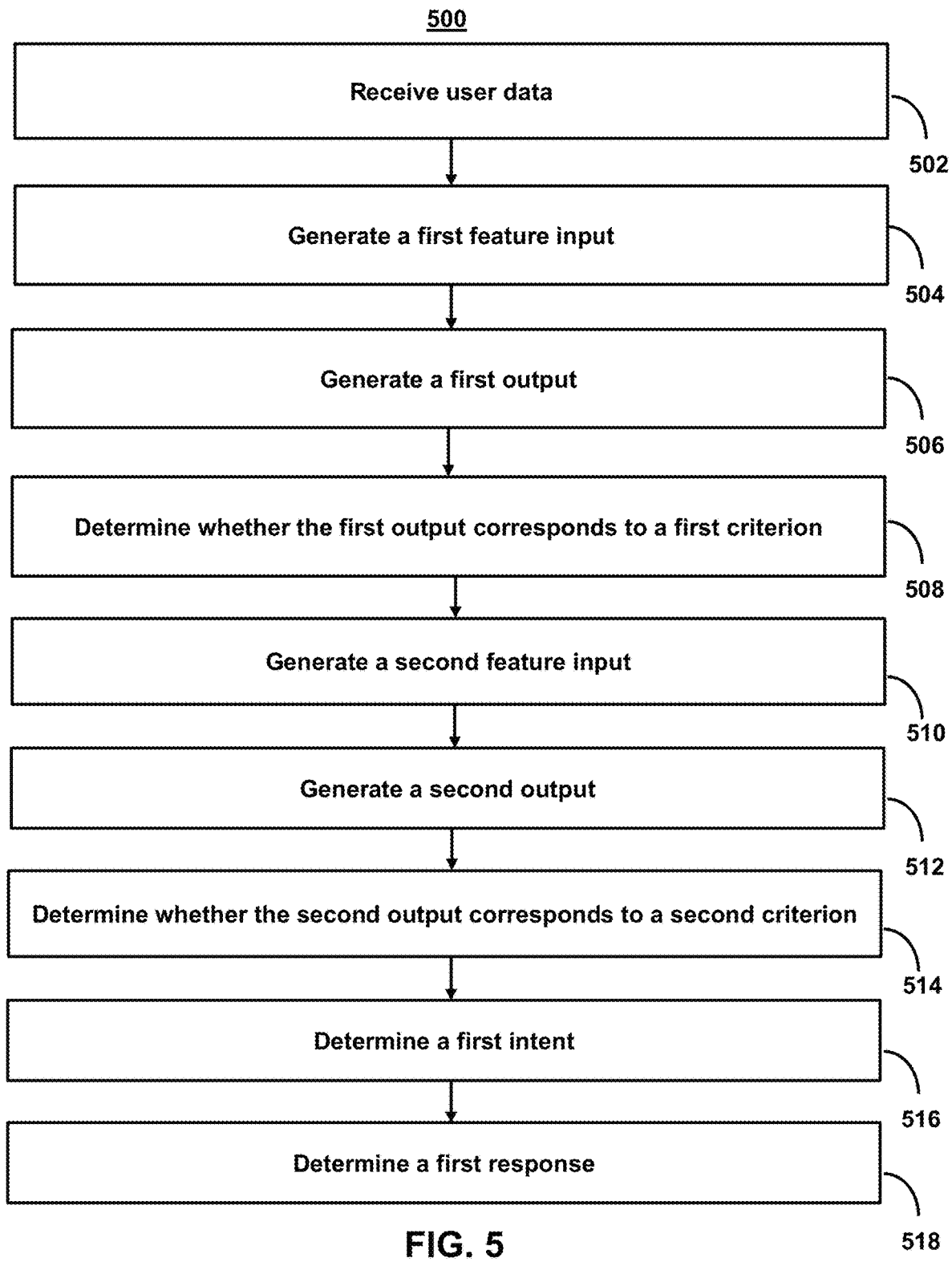
FIG. 5 shows a flowchart of the steps involved in selecting outputs from a dual-pathway model based on model-specific criteria, in accordance with one or more embodiments.

FIG. 5 shows a flowchart of the steps involved in selecting outputs from dual-pathway models based on model-specific criteria, in accordance with one or more embodiments. For example, the system may use process 500 (e.g., as implemented on one or more system components described above) in order to determine the intent of a user using a dual-pathway model that comprises two subnetworks.

At step 502, process 500 (e.g., using one or more components described above) receives user data. For example, the system may receive user data of a user interacting with a user interface. By doing so, the system may acquire information that may be used to determine the intent of a user.

At step 504, process 500 (e.g., using one or more components described above) generates a first feature input. For example, the system may generate a first feature input based on the user data. In some embodiments, the system may receive different types of information and generate a feature input based on that information. For example, the system may receive one or more user inputs, an application context, a user device type identifier, and/or a required number of (or limit of) potential user inputs.

At step 506, process 500 (e.g., using one or more components described above) generates a first output. For example, the system may process the first feature input through a first model of a dual-pathway model to generate a first output, wherein the first model comprises a deterministic word graph that generates outputs based on respective popularities of combinations of different text characters.

At step 508, process 500 (e.g., using one or more components described above) determines whether the first output corresponds to a first criterion. For example, the system may determine whether the first output corresponds to a first criterion specific to the first model.

In some embodiments, the system may select different models from a dual-pathway model based on one or more model-specific criteria. For example, determining whether the first output corresponds to the first criterion may comprise the system retrieving a plurality of available intents and determining whether the first output corresponds to one of the plurality of available intents. Additionally or alternatively, determining whether the second output corresponds to the second criterion may comprise the system determining, based on the second output, a first prediction confidence that the user has the first intent of a plurality of available intents and determining whether the first prediction confidence equals or exceeds a first threshold confidence. For example, in some embodiments, the system may determine a respective prediction confidence for each of the plurality of available intents and compare the respective prediction confidence for each of the plurality of available intents to the first threshold confidence.

For example, the dual-pathway model may comprise a plurality of models that comprise one or more arrangements into a pair of subnetworks. For example, the dual-pathway model may resemble a Siamese model. A Siamese model may comprise two or more identical subnetworks that share the same architecture and weights. Each subnetwork takes an input sample and produces a fixed-length vector, often referred to as an embedding or feature vector, that represents the input's characteristics in a lower-dimensional space. The subnetworks are trained to generate similar embeddings for similar inputs and dissimilar embeddings for dissimilar inputs. This training is typically done using pairs of examples, where the model is provided with both positive pairs (similar inputs) and negative pairs (dissimilar inputs). The objective is to minimize the distance or dissimilarity between embeddings of similar inputs and maximize the distance or dissimilarity between embeddings of dissimilar inputs. Once trained, the Siamese model can be used to compare the embeddings of new inputs and determine their similarity or dissimilarity. This is often done by calculating a distance metric, such as Euclidean distance or cosine similarity, between the embeddings. For example, the second model may be trained to minimize cosine distances between a first set of historical user inputs, wherein the first set of historical user inputs corresponds to a single intent, and maximize cosine distances between a second set of historical user inputs, wherein the second set of historical user inputs corresponds to different intents.

At step 510, process 500 (e.g., using one or more components described above) generates a second feature input. For example, the system may, in response to determining that the first output does not correspond to the first criterion, generate a second feature input based on the user data. For example, the system may determine, using the first model, a first response for the first intent. In some embodiments, the system may determine that a plurality of responses are required. However, in order to conserve processing time and/or power, the system may determine whether the responses are met based on a specific order. For example, the system may retrieve a plurality of responses for the first intent. The system may then determine a ranking for the plurality of responses. The system may then select to determine the first response based on the ranking.

At step 512, process 500 (e.g., using one or more components described above) generates a second output. For example, the system may process the second feature input through a second model of the dual-pathway model to generate a second output, wherein the second model comprises a semantic autocomplete model that generates outputs based on predicted confidences. For example, the system may use probabilistic programming. For example, probabilistic programming is a programming paradigm in which probabilistic models are specified and inference for these models is performed automatically. The system may also utilize the distributions generated over the possible model outcomes to determine prediction confidences. For example, the system may use a prediction confidence ("prediction_confidence").

The prediction confidence may be a confidence interval of a prediction that likely contains the mean value of the dependent variable given specific values of the independent variables. For example, a prediction confidence may be assigned to a potential intent, goal, and/or objective of a user. The system may determine the prediction confidence for each intent, goal, and/or objective and compare the respective prediction confidence to an intent confidence threshold ("intent_threshold"). The intent confidence threshold may be a threshold confidence required for the system to determine that a user has an intent corresponding to the prediction confidence. It should be noted that each intent may have a different confidence threshold. For example, the system may compare the first prediction confidence to a first threshold confidence. In some embodiments, the system may determine a threshold confidence based on one or more criteria. For example, the system may determine an accuracy metric for the first model and determine the first threshold confidence based on the accuracy metric. For example, if the system determines that the model used to determine the first prediction confidence is more accurate, the system may set a lower threshold confidence for selecting a model to generate a response. In contrast, if the system determines that the model used to determine the first prediction confidence is less accurate, the system may set a higher threshold confidence for selecting a model to generate a response.

In some embodiments, the system may determine a number of the plurality of available intents in which a corresponding prediction confidence equals or exceeds the first threshold confidence. For example, the system may determine whether a threshold number of responses (e.g., 1, 2, 3, 5, etc.) that have a respective prediction confidence can be generated using the first model. The system may then determine whether to use a second model to generate one or more responses based on whether the threshold number is met. In some embodiments, the threshold number may be zero (i.e., the system determines whether the first model may be used to generate any responses). Alternatively or additionally, the system may determine the threshold number based on the user device type of the user device on which the user interface is displayed. For example, the user device type may correspond to a smartphone or other device with a limited screen size. As such, the system may determine that fewer responses are needed (i.e., due to screen space limitations). Alternatively, the system may determine that the user device type is a desktop computer, which has ample screen space and for which numerous responses may be generated.

For example, the system may determine a number of the plurality of available intents in which a corresponding prediction confidence equals or exceeds the first threshold confidence. The system may then compare the number to a threshold number. The system may then determine to select the first model based on the number exceeding the threshold number, wherein the threshold number is zero. Alternatively or additionally, the system may determine a threshold number based on a user device type of a user device on which the user interface is displayed. The system may then compare the number to the threshold number. The system may then determine to select the first model based on the number exceeding the threshold number.

Additionally or alternatively, the system may determine a frequency at which the user has the first intent and determine the first threshold confidence based on the frequency. For example, if the system determines that the user has the first intent more often, the system may set a lower threshold confidence for selecting a model to generate a response. In contrast, if the system determines that the user has the first intent less often, the system may set a higher threshold confidence for selecting a model to generate a response.

At step 514, process 500 (e.g., using one or more components described above) determines whether the second output corresponds to a second criterion. For example, the system may determine whether the second output corresponds to a second criterion specific to the second model. For example, determining whether the second output corresponds to the second criterion may comprise the system determining, based on the second output, a first prediction confidence that the user has the first intent of a plurality of available intents and determining whether the first prediction confidence equals or exceeds a first threshold confidence.

At step 516, process 500 (e.g., using one or more components described above) determines a first intent. For example, the system may, in response to determining that the second output does correspond to the second criterion, determine that the user has a first intent of a plurality of intents. For example, the system may determine a number of the plurality of available intents in which a corresponding prediction confidence equals or exceeds the first threshold confidence. The system may then compare the number to a threshold number. The system may then determine to select the first model based on the number exceeding the threshold number, wherein the threshold number is zero. Alternatively or additionally, the system may determine a threshold number based on a user device type of a user device on which the user interface is displayed. The system may then compare the number to the threshold number. The system may then determine to select the first model based on the number exceeding the threshold number.

At step 518, process 500 (e.g., using one or more components described above) determines a first response. For example, the system may determine a first response for the first intent. In some embodiments, the system may then generate for display, on a user interface, a first potential user input corresponding to the first response. For example, the first potential user input may comprise a first text string for entry into a search field of the user interface. The system may likewise generate additional responses. For example, the system may generate additional responses in response to a user response (e.g., simultaneously), or the system may generate additional responses in a series following a user response (e.g., one additional response after each response).

In some embodiments, the system may monitor for subsequent user inputs and maintain, filter, and/or remove potential user inputs based on these inputs. For example, the system may receive a first user input into the search field, wherein the first user input comprises a first textual character. The system may determine whether the first textual character corresponds to the first text string. In response to determining that the first textual character corresponds to the first text string, the system may continue to generate for display the first potential user input. Alternatively or additionally, the system may receive a first user input into the search field, wherein the first user input comprises a first textual character. The system may determine whether the first textual character corresponds to the first text string. The system may, in response to determining that the first textual character does not correspond to the first text string, end display of the first potential user input.

In some embodiments, the system may perform other functions based on user inputs. For example, the system may determine additional predictions. For example, the system may receive a first user input into the search field, wherein the first user input comprises a first textual character. The system may determine whether the first textual character corresponds to the first text string. In response to determining that the first textual character does not correspond to the first text string, the system may determine, based on the user data and the first user input, a second prediction confidence that the user has a second intent of a plurality of available intents using the first model. Additionally or alternatively, the system may determine the plurality of available intents using the first model. The system may then determine a respective prediction confidence for each of the plurality of available intents. The system may compare the respective prediction confidence for each of the plurality of available intents to the first threshold confidence.

In some embodiments, each of these responses may be generated based on a corresponding model. For example, the system may determine, based on the user data, a second prediction confidence that the user has a second intent of the plurality of available intents. The system may then compare the second prediction confidence to a second threshold confidence. The system may, in response to the second prediction confidence equaling or exceeding the second threshold confidence, select a second model from the dual-pathway model corresponding to a second intent type of the second intent. The system may determine, using the second model, a second response for the second intent. The system may determine, based on the user data, whether the second response is met. The system may, in response to the second response not being met, generate for display, on the user interface, a second potential user input corresponding to meeting the second response.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
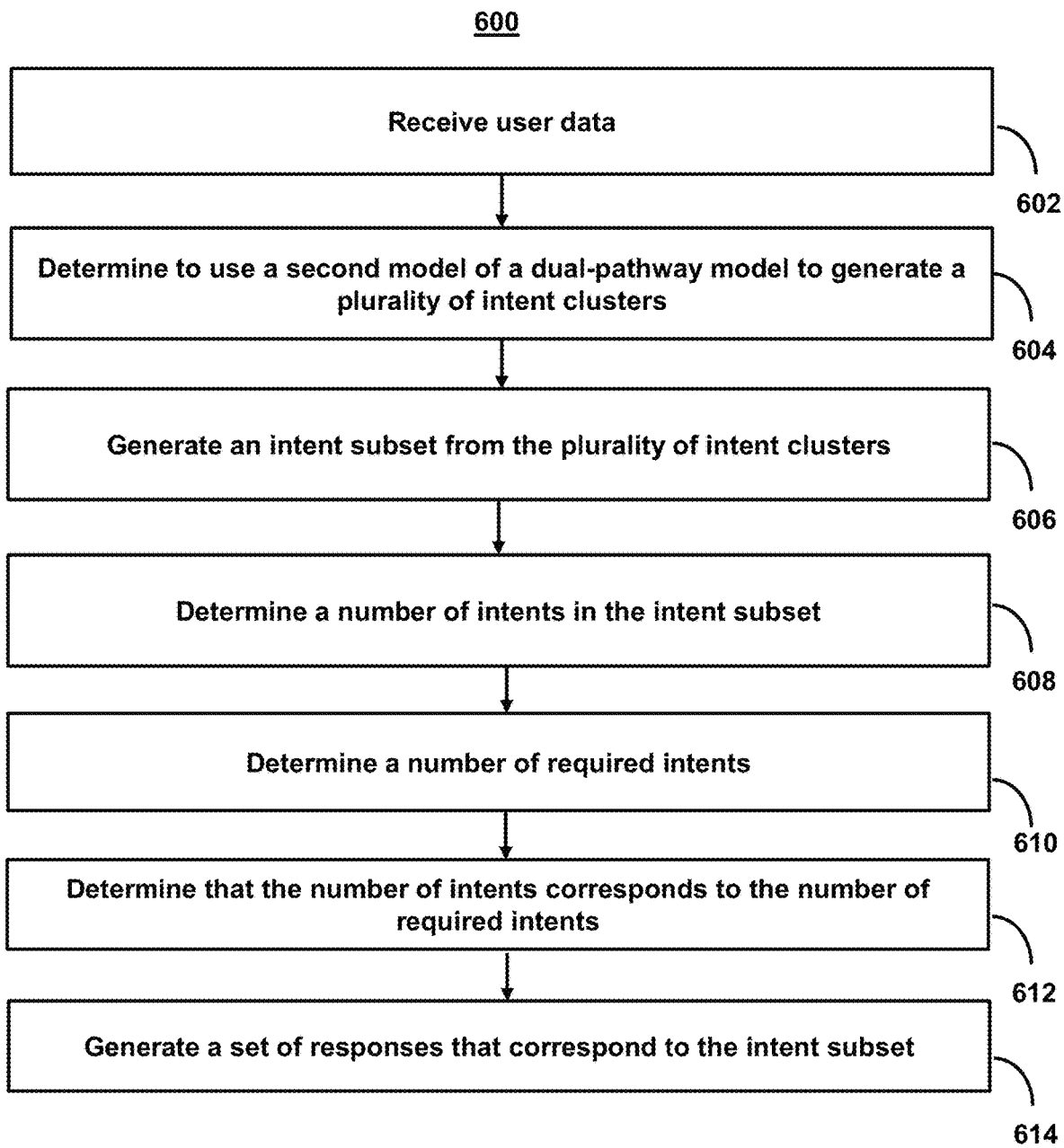
FIG. 6 shows a flowchart of the steps involved in generating cluster-based outputs from a dual-pathway model, in accordance with one or more embodiments.

FIG. 6 shows a flowchart of the steps involved in generating cluster-based outputs from a dual-pathway model, in accordance with one or more embodiments. For example, the system may use process 600 (e.g., as implemented on one or more system components described above) in order to determine the intent of a user using a dual-pathway model that comprises two subnetworks.

In order to determine the likely intent and generate a response that is both timely and pertinent, the system may use one or more models that are trained to first determine an intent cluster and then determine an intent from the cluster. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, similar intents (e.g., a first intent of a user to learn his/her maximum credit limit and a second intent of a user to learn a current amount in his/her bank account) may have similar feature inputs as much of the underlying aggregated information may be the same. Moreover, training data for a model (e.g., known historical intents and labeled feature inputs) may be sparse. Accordingly, determining a specific intent of a user with a high level of precision is difficult, even when using a machine learning model.

To overcome these technical challenges, the system may include a model, wherein the model is trained to cluster a plurality of specific intents into a plurality of intent clusters. As opposed to manually grouping potential intents, the system trains a model to identify common user queries that correspond to a group of intents. Accordingly, the system may generate intent clusters that provide access to specific intents and may be represented (e.g., in a user interface) by a single option. The system may also train a model to select a subset of the plurality of intent clusters from the plurality of intent clusters based on a first feature input, wherein each intent cluster of the plurality of intent clusters corresponds to a respective intent of a user following the first user action.

For example, the system may need to limit the number of options that appear in a given response (e.g., based on a screen size of a user device upon which the user interface is displayed). Accordingly, the model may be trained to select a subset of the plurality of intent clusters to be displayed.

For example, as opposed to determining a specific intent of a user, which may be difficult due to the sparseness of available information as well as the particularities of an individual user, the system instead attempts to select a group of intent clusters (e.g., each cluster corresponding to a plurality of specific intents). Each specific intent within the group of intent clusters may correspond to an option in a response. For example, by selecting a response, the user may access further responses for individual specific intents within the cluster. Accordingly, the system relies on the user to select the specific intent that is appropriate, and instead the system is trained to select the intent clusters. While counterintuitive, this approach leads to better results as the number of false positives (i.e., suggesting a specific intent of the user that is incorrect) is reduced. Moreover, as opposed to training a model to rank specific intents and then grouping the specific intents based on the ranking, which leads to all likely relevant specific intents being located in a single cluster (i.e., represented by a single response), the system allows for likely specific intents to be dispersed throughout the displayed options.

At step 602, process 600 (e.g., using one or more components described above) receives user data. For example, the system may receive user data of a user interacting with a user interface. By doing so, the system may acquire information that may be used to determine the intent of a user. For example, conversational responses include communications between a user and a system that may maintain a conversational tone, cadence, or speech pattern of a human during an interactive exchange between the user and the system. The interactive exchange may include the system responding to one or more user actions (which may include user inactions) and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real time or near real time) and accurately the intent, goal, or motivation behind a user input. These user inputs or actions may take various forms including speech commands, textual inputs, responses to system queries, and/or other user actions (e.g., logging in to a mobile application of the system). In each case, the system may aggregate information about the user, the user action, and/or other circumstances related to the user action (e.g., time of day, previous user actions, current account settings, etc.) in order to determine a likely intent of the user.

At step 604, process 600 (e.g., using one or more components described above) determines to use a second model of a dual-pathway model to generate a plurality of intent clusters. For example, the system may determine, based on a first output of a first model of a dual-pathway model, a first plurality of intent clusters corresponding to the user using a second model of a dual-pathway model. For example, the first plurality of intent clusters may comprise respective sets of ranked intents and/or each respective set of the respective sets of ranked intents may correspond to one intent cluster of the first plurality of intent clusters. In another example, the system may generate a first feature input based on the user data. The system may input the first feature input into the first model. The system may receive the first output from the first model, wherein the first model generates a directed acyclic graph with an initial vertex and a set of final vertices such that paths from the initial vertex to the final vertices represent suffixes of a string based on the user data.

In some embodiments, the system may use a dual-pathway model that comprises two subnetworks. For example, the dual-pathway model may resemble a Siamese model. A Siamese model may comprise two or more identical subnetworks that share the same architecture and weights. Each subnetwork takes an input sample and produces a fixed-length vector, often referred to as an embedding or feature vector, that represents the input's characteristics in a lower-dimensional space. The subnetworks are trained to generate similar embeddings for similar inputs and dissimilar embeddings for dissimilar inputs. This training is typically done using pairs of examples, where the model is provided with both positive pairs (similar inputs) and negative pairs (dissimilar inputs). The objective is to minimize the distance or dissimilarity between embeddings of similar inputs and maximize the distance or dissimilarity between embeddings of dissimilar inputs. Once trained, the Siamese model can be used to compare the embeddings of new inputs and determine their similarity or dissimilarity. This is often done by calculating a distance metric, such as Euclidean distance or cosine similarity, between the embeddings. For example, the second model may be trained to minimize cosine distances between a first set of historical user inputs, wherein the first set of historical user inputs corresponds to a single intent, and maximize cosine distances between a second set of historical user inputs, wherein the second set of historical user inputs corresponds to different intents.

In some embodiments, the first model may comprise a directed acyclic word graph. For example, the system may generate a first feature input based on the user data. The system may input the first feature input into the first model. The system may receive the first output from the first model, wherein the first model comprises a deterministic word graph that generates outputs based on respective popularities of combinations of different text characters. For example, the output (specific intents and/or suggestions with a mapped intent metadata) is generated by how the word-graph is populated. These outputs are then ranked by intent popularity.

For example, the system may determine, based on the first output of the first model of the dual-pathway model, to determine the first plurality of intent clusters corresponding to the user using the second model of a dual-pathway model. This process may comprise determining a number of responses generated by the first model from the dual-pathway model, determining that the number of responses does not correspond to the first number of required intents, and, in response to determining that the number of responses does not correspond to the first number of required intents, determining to use the second model to determine the first plurality of intent clusters. In another example, the system may determine, based on the first output of the first model of the dual-pathway model, to determine the first plurality of intent clusters corresponding to the user using the second model of a dual-pathway model. The system may perform this by determining a number of responses generated by the first model from the dual-pathway model, determining that the number of responses does not correspond to a threshold count, and, in response to determining that the number of responses does not correspond to the threshold count, determining to use the second model to determine the first plurality of intent clusters.

At step 606, process 600 (e.g., using one or more components described above) generates an intent subset from the plurality of intent clusters. For example, the system may generate, using the second model, a first intent subset comprising a highest-ranked intent in each of the respective sets of ranked intents. For example, the system may generate a second feature input based on the user data. The system may input the second feature input into the second model. The system may receive a second output from the second model, wherein the second model comprises a semantic autocomplete model that generates outputs based on predicted confidences, wherein the first intent subset is based on the second output.

For example, each subnetwork (or model) may take an input sample and produce a fixed-length vector, often referred to as an embedding or feature vector, that represents the input's characteristics in a lower-dimensional space. The subnetworks are trained to generate similar embeddings for similar inputs and dissimilar embeddings for dissimilar inputs. This training is typically done using pairs of examples, where the model is provided with both positive pairs (similar inputs) and negative pairs (dissimilar inputs). The objective is to minimize the distance or dissimilarity between embeddings of similar inputs and maximize the distance or dissimilarity between embeddings of dissimilar inputs. Once trained, the Siamese model can be used to compare the embeddings of new inputs and determine their similarity or dissimilarity. This is often done by calculating a distance metric, such as Euclidean distance or cosine similarity, between the embeddings. For example, the second model may be trained to minimize cosine distances between a first set of historical user inputs, wherein the first set of historical user inputs corresponds to a single intent, and maximize cosine distances between a second set of historical user inputs, wherein the second set of historical user inputs corresponds to different intents.

For example, the model may quantitatively express each specific intent as a plurality of values (e.g., a vector array). The system may then determine the distance (e.g., the similarities) between two specific intents based on a correlation distance. For example, the model may estimate the distance correlation between two vector arrays corresponding to two specific intents. The system may estimate the distance correlation by computing two matrices: the matrix of pairwise distances between observations in a sample from X and the analogous distance matrix for observations from Y. If the elements in these matrices co-vary together, the system may determine that X and Y have a large distance correlation (e.g., the specific intents are similar). If they do not, they have a small distance correlation (e.g., the specific intents are not similar). The distance correlation can be used to create a statistical test of independence between two variables or sets of variables. Specific intent with independence may be put into different intent clusters, whereas specific intents without independence may be put into the same intent cluster.

The system may then use unsupervised hierarchical clustering to build a hierarchy of intent clusters. The system may use agglomerative clustering (e.g., a "bottom-up" approach), in which each observation starts in its own cluster, and pairs of clusters are merged as one moves up the hierarchy. Alternatively or additionally, the system may use divisive clustering (e.g., a "top-down" approach), in which all observations start in one cluster, and splits are performed recursively as one moves down the hierarchy.

At step 608, process 600 (e.g., using one or more components described above) determines a number of intents in the intent subset. For example, the system may determine a first number of intents in the first intent subset.

In some embodiments, the system may determine that a plurality of responses are required. However, in order to conserve processing time and/or power, the system may determine whether the responses are met based on a specific order. For example, the system may retrieve a plurality of responses for the first intent. The system may then determine a ranking for the plurality of responses. The system may then select to determine the first response based on the ranking. For example, the system may process the second feature input through a second model of the dual-pathway model to generate a second output, wherein the second model comprises a semantic autocomplete model that generates outputs based on predicted confidences. For example, the system may use probabilistic programming. For example, probabilistic programming is a programming paradigm in which probabilistic models are specified and inference for these models is performed automatically. The system may also utilize the distributions generated over the possible model outcomes to determine prediction confidences. For example, the system may use a prediction confidence ("prediction_confidence").

The prediction confidence may be a confidence interval of a prediction that likely contains the mean value of the dependent variable given specific values of the independent variables. For example, a prediction confidence may be assigned to a potential intent, goal, and/or objective of a user. The system may determine the prediction confidence for each intent, goal, and/or objective and compare the respective prediction confidence to an intent confidence threshold ("intent_threshold"). The intent confidence threshold may be a threshold confidence required for the system to determine that a user has an intent corresponding to the prediction confidence. It should be noted that each intent may have a different confidence threshold. For example, the system may compare the first prediction confidence to a first threshold confidence. In some embodiments, the system may determine a threshold confidence based on one or more criteria. For example, the system may determine an accuracy metric for the first model and determine the first threshold confidence based on the accuracy metric. For example, if the system determines that the model used to determine the first prediction confidence is more accurate, the system may set a lower threshold confidence for selecting a model to generate a response. In contrast, if the system determines that the model used to determine the first prediction confidence is less accurate, the system may set a higher threshold confidence for selecting a model to generate a response.

At step 610, process 600 (e.g., using one or more components described above) determines a number of required intents. For example, the system may determine a first number of required intents for display in the user interface. In some embodiments, the system may receive different types of information and generate a feature input based on that information. For example, the system may receive one or more user inputs, an application context, a user device type identifier, and/or a required number of (or limit of) potential user inputs.

At step 612, process 600 (e.g., using one or more components described above) determines that the number of intents corresponds to the number of required intents. For example, the system may determine whether the first number of intents corresponds to the first number of required intents. By doing so, the system may determine how many intent determinations are required for populating a user interface. For example, the system may determine (e.g., based on application context, user device type, screen size, etc.) the number of potential user inputs, responses, and/or intents that need to be determined.

In some embodiments, the system may determine a number of potential user inputs, responses, and/or intents that need to be determined and may iterate through clusters of intents. The system may first select the highest-ranked intent from each cluster to fill any required intents. If additional (or fewer) intents are needed, the system may perform an additional iteration and/or filter the number of intents. For example, the system may determine a second number of required intents for display in the user interface. The system may determine whether the first number of intents corresponds to the second number of required intents. The system may, in response to determining that the first number of intents does not correspond to the second number of required intents, filter the first intent subset to generate a second intent subset that has a second number of intents that corresponds to the second number of required intents. In another example, the system may generate a second intent subset comprising a second-highest-ranked intent in each of the respective sets of ranked intents. The system may determine a second number of intents in the first intent subset. The system may determine a second number of required intents for display in the user interface. The system may determine whether the first number of intents corresponds to the second number of required intents. The system may, in response to determining that the first number of intents does not correspond to the second number of required intents, generate a third intent subset comprising the first intent subset and a portion of the second intent subset.

The system may modify the responses that are generated and/or displayed as more user actions are received at the user interface. For example, the system may receive a first user input into a search field of the user interface, wherein the first user input comprises a first textual character. The system may determine whether the first textual character corresponds to a first response in the first set of responses. The system may, in response to determining that the first textual character does not correspond to the first response in the first set of responses, end display of the first response.

At step 614, process 600 (e.g., using one or more components described above) generates a set of responses that correspond to the intent subset. For example, the system may, in response to determining that the first number of intents corresponds to the first number of required intents, generate for display, on a user interface, a first set of responses that correspond to the first intent subset. For example, the first set of responses that correspond to the first intent subset may comprise a plurality of text strings for entry into a search field of the user interface.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising generating content based on dual-pathway models.

2. A method, the method comprising selecting outputs from dual-pathway models based on model-specific criteria.

3. A method, the method comprising generating cluster-based outputs from dual-pathway models.

4. The method of any one of the preceding embodiments, the method comprising: receiving user data; determining, based on the user data, a first prediction count that a user has a first intent of a plurality of available intents using a first model of a dual-pathway model; comparing the first prediction count to a first threshold count for using a second model of the dual-pathway model; in response to the first prediction count equaling or exceeding the first threshold count, selecting the first model from the dual-pathway model; determining, using the first model, a first response for the first intent; and generating for display, on a user interface, a first potential user input corresponding to the first response, wherein the first potential user input comprises a first text string for entry into a search field of the user interface.

5. The method of any one of the preceding embodiments, wherein selecting the first model from the dual-pathway model in response to the first prediction count equaling or exceeding the first threshold count further comprises: determining a number of the plurality of available intents in which a corresponding prediction count equals or exceeds the first threshold count; comparing the number to a threshold number; and determining to select the first model based on the number exceeding the threshold number, wherein the threshold number is zero.

6. The method of any one of the preceding embodiments, wherein selecting the first model from the dual-pathway model in response to the first prediction count equaling or exceeding the first threshold count further comprises: determining a number of the plurality of available intents in which a corresponding prediction count equals or exceeds the first threshold count; determining a threshold number based on a user device type of a user device on which the user interface is displayed; comparing the number to the threshold number; and determining to select the first model based on the number exceeding the threshold number.

7. The method of any one of the preceding embodiments, further comprising: receiving a first user input into the search field, wherein the first user input comprises a first textual character; determining whether the first textual character corresponds to the first text string; and in response to determining that the first textual character corresponds to the first text string, continuing to generate for display the first potential user input.

8. The method of any one of the preceding embodiments, further comprising: receiving a first user input into the search field, wherein the first user input comprises a first textual character; determining whether the first textual character corresponds to the first text string; and in response to determining that the first textual character does not correspond to the first text string, ending display of the first potential user input.

9. The method of any one of the preceding embodiments, further comprising: receiving a first user input into the search field, wherein the first user input comprises a first textual character; determining whether the first textual character corresponds to the first text string; and in response to determining that the first textual character does not correspond to the first text string, determining, based on the user data and the first user input, a second prediction count that the user has a second intent of a plurality of available intents using the first model.

10. The method of any one of the preceding embodiments, wherein determining, based on the user data, the first prediction count that the user has the first intent of the plurality of available intents using the first model further comprises: determining the plurality of available intents using the first model; determining a respective prediction count for each of the plurality of available intents; and comparing the respective prediction count for each of the plurality of available intents to the first threshold count.

11. The method of any one of the preceding embodiments, wherein determining, based on the user data, the first prediction count that the user has the first intent of the plurality of available intents using the first model further comprises: generating a feature input based on the user data; inputting the feature input into the first model; and receiving an output from the first model, wherein the output comprises the first prediction count.

12. The method of any one of the preceding embodiments, further comprising: determining an accuracy metric for the first model; and determining the first threshold count based on the accuracy metric.

13. The method of any one of the preceding embodiments, further comprising: determining a frequency at which the user has the first intent; and determining the first threshold count based on the frequency.

14. The method of any one of the preceding embodiments, wherein selecting the first model further comprises: determining a first intent type of the first intent; and comparing the first intent type with listings of respective models that correspond to each intent type of the plurality of available intents to determine that the first model corresponds to the first intent type.

15. The method of any one of the preceding embodiments, further comprising: retrieving a plurality of responses for the first intent; determining a ranking for the plurality of responses; and selecting to determine the first response based on the ranking.

16. The method of any one of the preceding embodiments, wherein the first model comprises a deterministic word graph model, and wherein the second model comprises a semantic autocomplete model.

17. The method of any one of the preceding embodiments, wherein the second model is trained to: minimize cosine distances between a first set of user inputs, wherein the first set of user inputs corresponds to a single intent; and maximize cosine distances between a second set of user inputs, wherein the second set of user inputs corresponds to different intents.

18. The method of any one of the preceding embodiments, the method comprising: receiving user data of a user interacting with a user interface; generating a first feature input based on the user data; processing the first feature input through a first model of a dual-pathway model to generate a first output, wherein the first model comprises a deterministic word graph that generates outputs based on respective popularities of combinations of different text characters; determining whether the first output corresponds to a first criterion specific to the first model; in response to determining that the first output does not correspond to the first criterion, generating a second feature input based on the user data; processing the second feature input through a second model of the dual-pathway model to generate a second output, wherein the second model comprises a semantic autocomplete model that generates outputs based on predicted confidences; determining whether the second output corresponds to a second criterion specific to the second model; in response to determining that the second output does correspond to the second criterion, determining that the user has a first intent of a plurality of intents; and determining a first response for the first intent.

19. The method of any one of the preceding embodiments, wherein determining whether the first output corresponds to the first criterion further comprises: retrieving a plurality of available intents; and determining whether the first output corresponds to one of the plurality of available intents.

20. The method of any one of the preceding embodiments, wherein determining whether the second output corresponds to the second criterion further comprises: determining, based on the second output, a first prediction confidence that the user has the first intent of a plurality of available intents; and determining whether the first prediction confidence equals or exceeds a first threshold confidence.

21. The method of any one of the preceding embodiments, further comprising: determining a respective prediction confidence for each of the plurality of available intents; and comparing the respective prediction confidence for each of the plurality of available intents to the first threshold confidence.

22. The method of any one of the preceding embodiments, further comprising: determining an accuracy metric for the second model; and determining the first threshold confidence based on the accuracy metric.

23. The method of any one of the preceding embodiments, further comprising: determining a frequency at which the user has the first intent; and determining the first threshold confidence based on the frequency.

24. The method of any one of the preceding embodiments, further comprising: generating for display, on the user interface, a first potential user input corresponding to the first response, wherein the first potential user input comprises a first text string for entry into a search field of the user interface; receiving a first user input into the search field, wherein the first user input comprises a first textual character; determining whether the first textual character corresponds to the first text string; and in response to determining that the first textual character corresponds to the first text string, continuing to generate for display the first potential user input.

25. The method of any one of the preceding embodiments, further comprising: generating for display, on the user interface, a first potential user input corresponding to the first response, wherein the first potential user input comprises a first text string for entry into a search field of the user interface; receiving a first user input into the search field, wherein the first user input comprises a first textual character; determining whether the first textual character corresponds to the first text string; and in response to determining that the first textual character does not correspond to the first text string, ending display of the first potential user input.

26. The method of any one of the preceding embodiments, further comprising: generating for display, on the user interface, a first potential user input corresponding to the first response, wherein the first potential user input comprises a first text string for entry into a search field of the user interface; receiving a first user input into the search field, wherein the first user input comprises a first textual character; determining whether the first textual character corresponds to the first text string; and in response to determining that the first textual character does not correspond to the first text string, determining, based on the user data and the first user input, a third feature input.

27. The method of any one of the preceding embodiments, further comprising: retrieving a plurality of responses for the first intent; determining a ranking for the plurality of responses; and selecting to determine the first response based on the ranking.

28. The method of any one of the preceding embodiments, wherein generating the first feature input based on the user data further comprises: determining a first user input; determining an application context; and determining a number of potential user inputs.

29. The method of any one of the preceding embodiments, wherein processing the first feature input through the first model of the dual-pathway model to generate the first output comprises generating a directed acyclic graph with an initial vertex and a set of final vertices such that paths from the initial vertex to the final vertices represent suffixes of a string based on the user data.

30. The method of any one of the preceding embodiments, wherein processing the second feature input through the second model further comprises: training the second model to minimize cosine distances between a first set of user inputs, wherein the first set of user inputs corresponds to a single intent; and training the second model to maximize cosine distances between a second set of user inputs, wherein the second set of user inputs corresponds to different intents.

31. The method of any one of the preceding embodiments, the method comprising: receiving user data of a user interacting with a user interface; determining, based on a first output of a first model of a dual-pathway model, a first plurality of intent clusters corresponding to the user using a second model of a dual-pathway model, wherein the first plurality of intent clusters comprise respective sets of ranked intents, and wherein each respective set of the respective sets of ranked intents correspond to one intent cluster of the first plurality of intent clusters; generating, using the second model, a first intent subset comprising a highest-ranked intent in each of the respective sets of ranked intents; determining a first number of intents in the first intent subset; determining a first number of required intents for display in the user interface; determining whether the first number of intents corresponds to the first number of required intents; and in response to determining that the first number of intents corresponds to the first number of required intents, generating for display, on a user interface, a first set of responses that correspond to the first intent subset, respectively.

32. The method of any one of the preceding embodiments, wherein the first set of responses that correspond to the first intent subset, respectively, comprise a plurality of text strings for entry into a search field of the user interface.

33. The method of any one of the preceding embodiments, further comprising: determining a second number of required intents for display in the user interface; determining whether the first number of intents corresponds to the second number of required intents; and in response to determining that the first number of intents does not correspond to the second number of required intents, filtering the first intent subset to generate a second intent subset that has a second number of intents that corresponds to the second number of required intents.

34. The method of any one of the preceding embodiments, further comprising: generating a second intent subset comprising a second-highest-ranked intent in each of the respective sets of ranked intents; determining a second number of intents in the first intent subset; determining a second number of required intents for display in the user interface; determining whether the first number of intents corresponds to the second number of required intents; and in response to determining that the first number of intents does not correspond to the second number of required intents, generating a third intent subset comprising the first intent subset and a portion of the second intent subset.

35. The method of any one of the preceding embodiments, wherein determining, based on the first output of the first model of the dual-pathway model, the first plurality of intent clusters corresponding to the user using the second model of a dual-pathway model further comprises: determining a number of responses generated by the first model from the dual-pathway model; determining that the number of responses does not correspond to the first number of required intents; and in response to determining that the number of responses does not correspond to the first number of required intents, determining to use the second model to determine the first plurality of intent clusters.

36. The method of any one of the preceding embodiments, wherein determining, based on the first output of the first model of the dual-pathway model, the first plurality of intent clusters corresponding to the user using the second model of a dual-pathway model further comprises: determining a number of responses generated by the first model from the dual-pathway model; determining that the number of responses does not correspond to a threshold count; and in response to determining that the number of responses does not correspond to the threshold count, determining to use the second model to determine the first plurality of intent clusters.

37. The method of any one of the preceding embodiments, further comprising: receiving a first user input into a search field of the user interface, wherein the first user input comprises a first textual character; determining whether the first textual character corresponds to a first response in the first set of responses; and in response to determining that the first textual character does not correspond to the first response in the first set of responses, ending display of the first response.

38. The method of any one of the preceding embodiments, further comprising: generating a first feature input based on the user data; inputting the first feature input into the first model; and receiving the first output from the first model, wherein the first model comprises a deterministic word graph that generates outputs based on respective popularities of combinations of different text characters.

39. The method of any one of the preceding embodiments, further comprising: generating a first feature input based on the user data; inputting the first feature input into the first model; and receiving the first output from the first model, wherein the first model generates a directed acyclic graph with an initial vertex and a set of final vertices such that paths from the initial vertex to the final vertices represent suffixes of a string based on the user data.

40. The method of any one of the preceding embodiments, further comprising: generating a second feature input based on the user data; inputting the second feature input into the second model; and receiving a second output from the second model, wherein the second model comprises a semantic autocomplete model that generates outputs based on predicted confidences, wherein the first intent subset is based on the second output.

41. The method of any one of the preceding embodiments, wherein the second model is trained to: minimize cosine distances between a first set of historical user inputs, wherein the first set of historical user inputs corresponds to a single intent; and maximize cosine distances between a second set of historical user inputs, wherein the second set of historical user inputs corresponds to different intents.

42. The method of any one of the preceding embodiments, wherein generating the first intent subset comprising the highest-ranked intent in each of the respective sets of ranked intents further comprises: determining respective prediction confidences that the user has an intent corresponding to respective intents for each intent cluster in the first plurality of intent clusters; and determining whether the respective prediction confidences equal or exceed a first threshold confidence.

43. The method of any one of the preceding embodiments, wherein receiving the user data of the user interacting with the user interface further comprises: determining a first user input of the user; and determining an application context, wherein the application context is used to determine the first plurality of intent clusters.

44. A non-transitory, computer-readable medium storing instructions that, when executed by a data processing apparatus, cause the data processing apparatus to perform operations comprising those of any of embodiments 1-43.

45. A system comprising one or more processors; and memory storing instructions that, when executed by the processors, cause the processors to effectuate operations comprising those of any of embodiments 1-43.

46. A system comprising means for performing any of embodiments 1-43.

What is claimed is:

1. A system for generating content based on dual-pathway models, the system comprising:
one or more processors; and
one or more non-transitory, computer-readable media comprising instructions recorded thereon that, when executed by the one or more processors, cause operations comprising:
receiving first user data;
determining, based on the first user data, a first prediction count that a user has a first intent of a plurality of available intents using a first model of a dual-pathway model, wherein the first model comprises a deterministic word graph model;
comparing the first prediction count to a first threshold count for using a second model of the dual-pathway model, wherein the second model comprises a semantic autocomplete model, and wherein the first threshold count comprises a required number of potential user inputs to be generated for display that have a threshold confidence;
in response to the first prediction count equaling or exceeding the first threshold count, selecting the first model from the dual-pathway model;
determining, using the first model, a first response for the first intent;
generating for display, on a user interface, a first potential user input corresponding to the first intent, wherein the first potential user input comprises a first text string for entry into a search field of the user interface;
receiving a first user input into the search field, wherein the first user input comprises a first textual character;
determining whether the first textual character corresponds to the first text string;
in response to determining that the first textual character corresponds to the first text string, continuing to generate for display the first potential user input;
determining, based on second user data, a second prediction count that the user has a second intent of the plurality of available intents using the first model of the dual-pathway model;
comparing the second prediction count to the first threshold count for using the second model of the dual-pathway model;
in response to the first prediction count not equaling or exceeding the first threshold count, selecting the second model from the dual-pathway model;
determining, using the second model, a second response for the second intent; and
generating for display, on the user interface, a second potential user input corresponding to the second response.

2. A method for generating content based on dual-pathway models, the method comprising:
receiving first user data;
determining, based on the first user data, a first prediction count that a user has a first intent of a plurality of available intents using a first model of a dual-pathway model;
comparing the first prediction count to a first threshold count for using a second model of the dual-pathway model, wherein the first threshold count comprises a required number of potential user inputs to be generated for display that have a threshold confidence;
in response to the first prediction count equaling or exceeding the first threshold count, selecting the first model from the dual-pathway model;
determining, using the first model, a first response for the first intent;
generating for display, on a user interface, a first potential user input corresponding to the first response, wherein the first potential user input comprises a first text string for entry into a search field of the user interface;
receiving second user data;
determining, based on the second user data, a second prediction count that the user has a second intent of the plurality of available intents using the first model of the dual-pathway model;
comparing the second prediction count to the first threshold count for using the second model of the dual-pathway model;
in response to the first prediction count not equaling or exceeding the first threshold count, selecting the second model from the dual-pathway model;
determining, using the second model, a second response for the second intent; and
generating for display, on the user interface, a second potential user input corresponding to the second response.

3. The method of claim 2, wherein selecting the first model from the dual-pathway model in response to the first prediction count equaling or exceeding the first threshold count further comprises:
determining a number of the plurality of available intents in which a corresponding prediction count equals or exceeds the first threshold count;
comparing the number to a threshold number; and determining to select the first model based on the number exceeding the threshold number, wherein the threshold number is zero.

4. The method of claim 2, wherein selecting the first model from the dual-pathway model in response to the first prediction count equaling or exceeding the first threshold count further comprises:
   determining a number of the plurality of available intents in which a corresponding prediction count equals or exceeds the first threshold count;
   determining a threshold number based on a user device type of a user device on which the user interface is displayed;
   comparing the number to the threshold number; and
   determining to select the first model based on the number exceeding the threshold number.

5. The method of claim 2, further comprising:
   receiving a first user input into the search field, wherein the first user input comprises a first textual character;
   determining whether the first textual character corresponds to the first text string; and
   in response to determining that the first textual character corresponds to the first text string, continuing to generate for display the first potential user input.

6. The method of claim 2, further comprising:
   receiving a first user input into the search field, wherein the first user input comprises a first textual character;
   determining whether the first textual character corresponds to the first text string; and
   in response to determining that the first textual character does not correspond to the first text string, ending display of the first potential user input.

7. The method of claim 2, further comprising:
   receiving a first user input into the search field, wherein the first user input comprises a first textual character;
   determining whether the first textual character corresponds to the first text string; and
   in response to determining that the first textual character does not correspond to the first text string, determining, based on the first user data and the first user input, a second prediction count that the user has a second intent of a plurality of available intents using the first model.

8. The method of claim 2, wherein determining, based on the first user data, the first prediction count that the user has the first intent of the plurality of available intents using the first model further comprises:
   determining the plurality of available intents using the first model;
   determining a respective prediction count for each of the plurality of available intents; and
   comparing the respective prediction count for each of the plurality of available intents to the first threshold count.

9. The method of claim 2, wherein determining, based on the first user data, the first prediction count that the user has the first intent of the plurality of available intents using the first model further comprises:
   generating a feature input based on the first user data;
   inputting the feature input into the first model; and
   receiving an output from the first model, wherein the output comprises the first prediction count.

10. The method of claim 2, further comprising:
    determining an accuracy metric for the first model; and
    determining the first threshold count based on the accuracy metric.

11. The method of claim 2, further comprising:
    determining a frequency at which the user has the first intent; and
    determining the first threshold count based on the frequency.

12. The method of claim 2, wherein selecting the first model further comprises:
    determining a first intent type of the first intent; and
    comparing the first intent type with listings of respective models that correspond to each intent type of the plurality of available intents to determine that the first model corresponds to the first intent type.

13. The method of claim 2, further comprising:
    retrieving a plurality of responses for the first intent;
    determining a ranking for the plurality of responses; and
    selecting to determine the first response based on the ranking.

14. The method of claim 2, wherein the first model comprises a deterministic word graph model, and wherein the second model comprises a semantic autocomplete model.

15. The method of claim 2, wherein the second model is trained to:
    minimize cosine distances between a first set of user inputs, wherein the first set of user inputs corresponds to a single intent; and
    maximize cosine distances between a second set of user inputs, wherein the second set of user inputs corresponds to different intents.

16. One or more non-transitory, computer-readable media comprising instructions that, when executed by one or more processors, cause operations comprising:
    determining, based on first user data, a first prediction count that a user has a first intent of a plurality of available intents using a first model of a dual-pathway model;
    comparing the first prediction count to a first threshold count for using a second model of the dual-pathway model, wherein the first threshold count comprises a required number of potential user inputs to be generated for display that have a threshold confidence;
    in response to the first prediction count equaling or exceeding the first threshold count, selecting the first model from the dual-pathway model;
    determining, using the first model, a first response for the first intent;
    generating for display, on a user interface, a first potential user input corresponding to the first response, wherein the first potential user input comprises a first text string for entry into a search field of the user interface;
    determining, based on second user data, a second prediction count that the user has a second intent of the plurality of available intents using the first model of the dual-pathway model;
    comparing the second prediction count to the first threshold count for using the second model of the dual-pathway model;
    in response to the first prediction count not equaling or exceeding the first threshold count, selecting the second model from the dual-pathway model;
    determining, using the second model, a second response for the second intent; and
    generating for display, on the user interface, a second potential user input corresponding to the second response.

17. The one or more non-transitory, computer-readable media of claim 16, wherein selecting the first model from the dual-pathway model in response to the first prediction count equaling or exceeding the first threshold count further comprises:
- determining a number of the plurality of available intents in which a corresponding prediction count equals or exceeds the first threshold count;
- comparing the number to a threshold number; and
- determining to select the first model based on the number exceeding the threshold number, wherein the threshold number is zero.

18. The one or more non-transitory, computer-readable media of claim 16, wherein selecting the first model from the dual-pathway model in response to the first prediction count equaling or exceeding the first threshold count further comprises:
- determining a number of the plurality of available intents in which a corresponding prediction count equals or exceeds the first threshold count;
- determining a threshold number based on a user device type of a user device on which the user interface is displayed;
- comparing the number to the threshold number; and
- determining to select the first model based on the number exceeding the threshold number.

19. The one or more non-transitory, computer-readable media of claim 16, wherein the instructions further cause operations comprising:
- receiving a first user input into the search field, wherein the first user input comprises a first textual character;
- determining whether the first textual character corresponds to the first text string; and
- in response to determining that the first textual character corresponds to the first text string, continuing to generate for display the first potential user input.

20. The one or more non-transitory, computer-readable media of claim 16, wherein the second model is trained to:
- minimize cosine distances between a first set of user inputs, wherein the first set of user inputs corresponds to a single intent; and
- maximize cosine distances between a second set of user inputs, wherein the second set of user inputs corresponds to different intents.

* * * * *